United States Patent
Han et al.

(10) Patent No.: US 11,395,003 B2
(45) Date of Patent: Jul. 19, 2022

(54) SYSTEM AND METHOD FOR SEGMENTING IMMERSIVE VIDEO

(71) Applicant: AT&T Intellectual Property I, L.P., Atlanta, GA (US)

(72) Inventors: Bo Han, Bridgewater, NJ (US); Vijay Gopalakrishnan, Edison, NJ (US); Jackson Jarrell Pair, Hermosa Beach, CA (US); Vikash Sharma, Marina Del Rey, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/020,229

(22) Filed: Sep. 14, 2020

(65) Prior Publication Data

US 2020/0413098 A1 Dec. 31, 2020

Related U.S. Application Data

(63) Continuation of application No. 15/949,797, filed on Apr. 10, 2018, now Pat. No. 10,812,828.

(51) Int. Cl.
*H04N 19/00* (2014.01)
*H04N 19/597* (2014.01)
(Continued)

(52) U.S. Cl.
CPC ....... *H04N 19/597* (2014.11); *H04N 5/23238* (2013.01); *H04N 13/161* (2018.05); *H04N 19/174* (2014.11)

(58) Field of Classification Search
CPC .. H04N 19/597; H04N 19/174; H04N 13/161; H04N 5/23238
See application file for complete search history.

(56) References Cited

U.S. PATENT DOCUMENTS 5,134,476 A * 7/1992 Aravind ............... H04N 19/50 348/390.1
6,215,820 B1 * 4/2001 Bagni .................. H04N 19/176 375/240

(Continued)

FOREIGN PATENT DOCUMENTS

EP 2824884 A1 1/2015
WO 20170140948 8/2017
(Continued)

OTHER PUBLICATIONS

Xie et al. 360ProbDASH: Improving QoE of 360 Video Streaming Using Tile-based HTTP Adaptive Streaming Proceeding MM '17 Proceedings of the 25th ACM international conference on Multimedia pp. 315-323.*

(Continued)

*Primary Examiner* — Frank F Huang
(74) *Attorney, Agent, or Firm* — Guntin & Gust, PLC; Atanu Das

(57) ABSTRACT

Aspects of the subject disclosure may include, for example, identifying a field of view (FoV) within a first frame of a video that occupies a sub-portion of the frame. A size is determined by subdividing a portion of the video according to a tiling scenario. Tiles overlapping the FoV are detected, and an updated size is determined based on an encoded version of the tiles and compared to a reference size. Responsive to the updated size being less than the reference size, the reference size is adjusted to the updated size, the tiling scenario is adjusted according to an adjusted tiling scenario, and the determining of the size is repeated based on the adjusted tiling scenario. Responsive to the updated size not being less than the reference size, a preferred tiling scenario is identified based on the adjusted tiling scenario for tiling the video. Other embodiments are disclosed.

20 Claims, 12 Drawing Sheets

(51) Int. Cl.
*H04N 13/161* (2018.01)
*H04N 5/232* (2006.01)
*H04N 19/174* (2014.01)

(56) References Cited

U.S. PATENT DOCUMENTS

| | | | |
|---|---|---|---|
| 8,074,241 B2 | 12/2011 | Arfidsson et al. | |
| 9,584,819 B2 | 2/2017 | Wang et al. | |
| 9,615,177 B2 | 4/2017 | Englert et al. | |
| 2009/0003714 A1* | 1/2009 | Subramaniam | H04N 19/426 382/232 |
| 2009/0238479 A1* | 9/2009 | Jaggi | H04N 19/172 382/236 |
| 2011/0194613 A1* | 8/2011 | Chen | H04N 19/107 375/240.24 |
| 2012/0092348 A1 | 4/2012 | McCutchen et al. | |
| 2016/0198140 A1 | 7/2016 | Nadler | |
| 2016/0277772 A1 | 9/2016 | Campbell et al. | |
| 2016/0352791 A1 | 12/2016 | Adams et al. | |
| 2016/0353146 A1 | 12/2016 | Weaver et al. | |
| 2017/0075416 A1 | 3/2017 | Armstrong | |
| 2017/0118540 A1 | 4/2017 | Thomas et al. | |
| 2017/0155912 A1 | 6/2017 | Thomas et al. | |
| 2017/0237983 A1 | 8/2017 | Adsumilli et al. | |
| 2017/0294049 A1 | 10/2017 | Zhou | |
| 2017/0324951 A1 | 11/2017 | Raveendran et al. | |
| 2017/0339392 A1 | 11/2017 | Forutanpour et al. | |
| 2017/0347026 A1 | 11/2017 | Hannuksela | |
| 2017/0347044 A1* | 11/2017 | Douady-Pleven | G06T 7/00 |
| 2017/0374411 A1 | 12/2017 | Lederer et al. | |
| 2018/0020204 A1 | 1/2018 | Pang et al. | |
| 2018/0302604 A1* | 10/2018 | Zhou | H04N 19/167 |
| 2019/0313119 A1 | 10/2019 | Han et al. | |

FOREIGN PATENT DOCUMENTS

| | | |
|---|---|---|
| WO | 2017205794 | 11/2017 |
| WO | 2018011054 A1 | 1/2018 |

OTHER PUBLICATIONS

Qian et al. "Optimizing 360 video delivery over cellular networks," in Proceedings of the 5th Workshop on All Things Cellular: Operations, Applications and Challenges, ser. ATC '16. New York, NY, USA: ACM, 2016, pp. 1-6.*

Corbillon, Xavier et al., "360-degree video head movement dataset", Proceedings of the 8th ACM on Multimedia Systems Conference, ACM, 2017, 6 pages.

Ghosh, Arnob et al., "A rate adaptation algorithm for tile-based 360-degree video streaming", arXiv preprint arXiv:1704.08215, https://arxiv.org/pdf/1704.08215, 2017.

Graf, Mario et al., "Towards bandwidth efficient adaptive streaming of omnidirectional video over http: Design, implementation, and evaluation", Proceedings of the 8th ACM on Multimedia Systems Conference, ACM, 2017.

Ozcinar, Cagri et al., "Viewport-aware adaptive 360 {\deg} video streaming using tiles for virtual reality", arXiv preprint arXiv:1711. 02386, https://arxiv.org/pdf/1711.02386, 2017.

Qian, Feng et al., "Optimizing 360 video delivery over cellular networks." Proceedings of the 5th Workshop on All Things Cellular: Operations, Applications and Challenges, ACM, 2016, pp. 1-6.

Xie, Lan et al., "360ProbDASH: Improving QoE of 360 Video Streaming Using Tile-based HTTP Adaptive Streaming", 2017 Association for Computing Machinery., 2017, 9 pages.

* cited by examiner

230

240

250

251

252

$S_{2\times4}$ fdd $S_{4\times8}$ $S_{8\times16}$

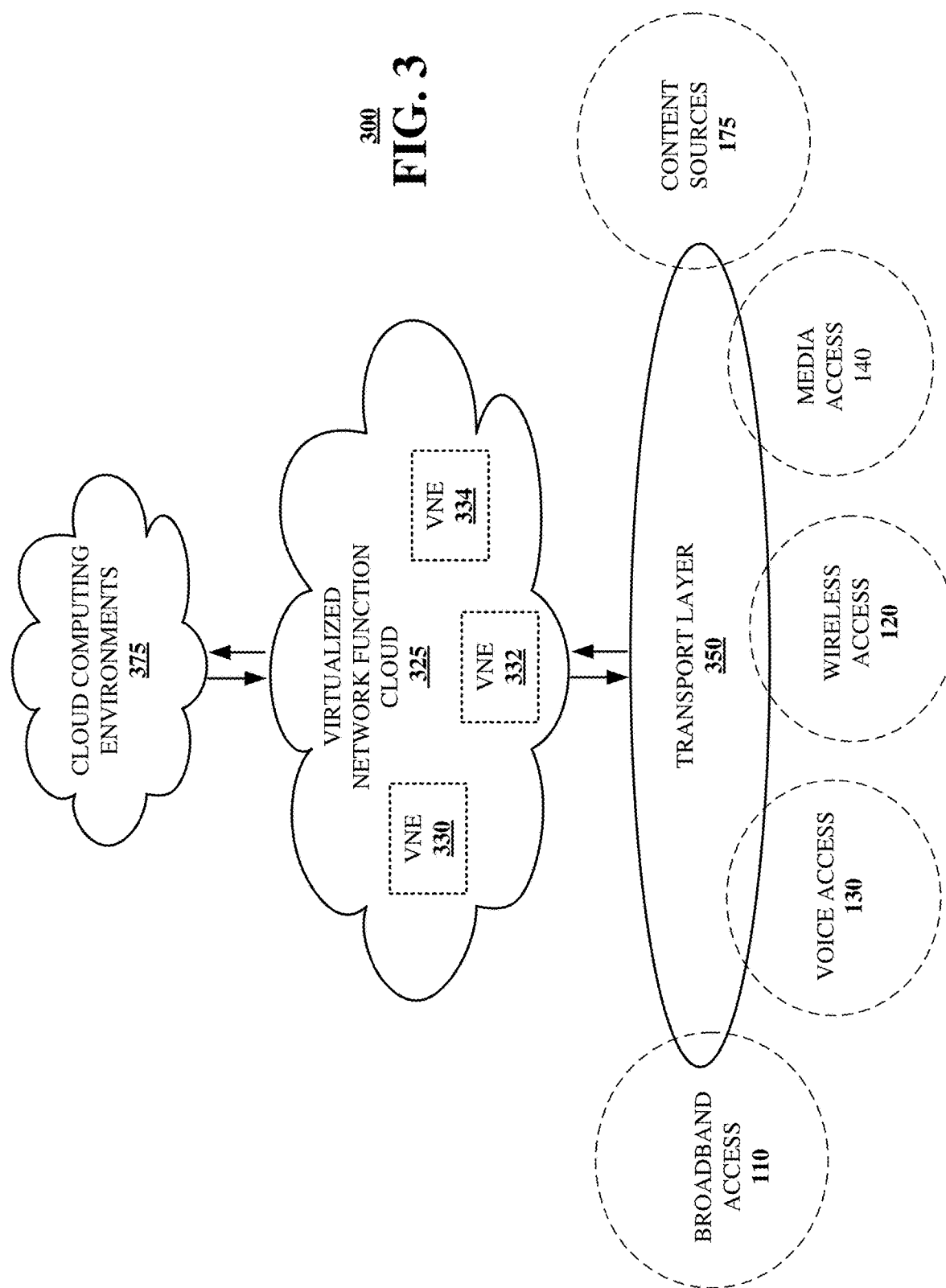

SYSTEM AND METHOD FOR SEGMENTING IMMERSIVE VIDEO

CROSS REFERENCE TO RELATED APPLICATIONS

This application is a continuation of U.S. patent application Ser. No. 15/949,797 filed on Apr. 10, 2018. All sections of the aforementioned application are incorporated herein by reference in their entirety.

FIELD OF THE DISCLOSURE

The subject disclosure relates to a system and method for segmenting immersive video.

BACKGROUND

Recent years have witnessed increasing commercial progress of the virtual reality (VR) technology, which has eventually stepped out of labs. It is projected to form a substantial market by 2020. Users can now experience VR capabilities on their mobile devices using affordable VR devices such as a Google Cardboard. Immersive videos, also known as 360-degree videos or spherical videos, play an important role in a VR ecosystem. Such immersive videos provide users with panoramic views and create a unique viewing experience. Immersive videos, such as 360-degree videos can be recorded by specially adapted cameras, such as omnidirectional cameras or camera array systems (e.g., Facebook Surround 360 Open Edition camera design and stitching code). They simultaneously record all 360 degrees of a scene that can be "wrapped" onto at least a portion of a 3D sphere, with the cameras at its center.

When watching a 360 video, a viewer at a spherical center can freely control a viewing direction, such that each playback creates a unique viewing experience. A user wearing a VR headset can adjust a viewing orientation by changing a pitch, yaw, and/or roll, which correspond to rotating along an X, Y, and Z axes, respectively. The 360 video player computes and displays the viewing area based on the orientation and the Field of View (FoV). The FoV defines the extent of the observable area, which is usually a fixed parameter of a VR headset (e.g., 110° horizontally and 90° vertically).

360 videos are very popular on major video platforms such as YouTube® and Facebook®. Despite their popularity, there is a lack of in-depth understanding of many of its critical aspects such as performance and resource consumption. Typically, 360 video largely inherits transport or delivery schemes from traditional Internet videos. This may simplify deployment, but tends to make 360 video streaming cellular-unfriendly, because a video player would fetch an entire video, including both visible and invisible portions. Such deployments lead to tremendous resource inefficiency on cellular networks with limited bandwidth, metered link, fluctuating throughput, and high device radio energy consumption.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
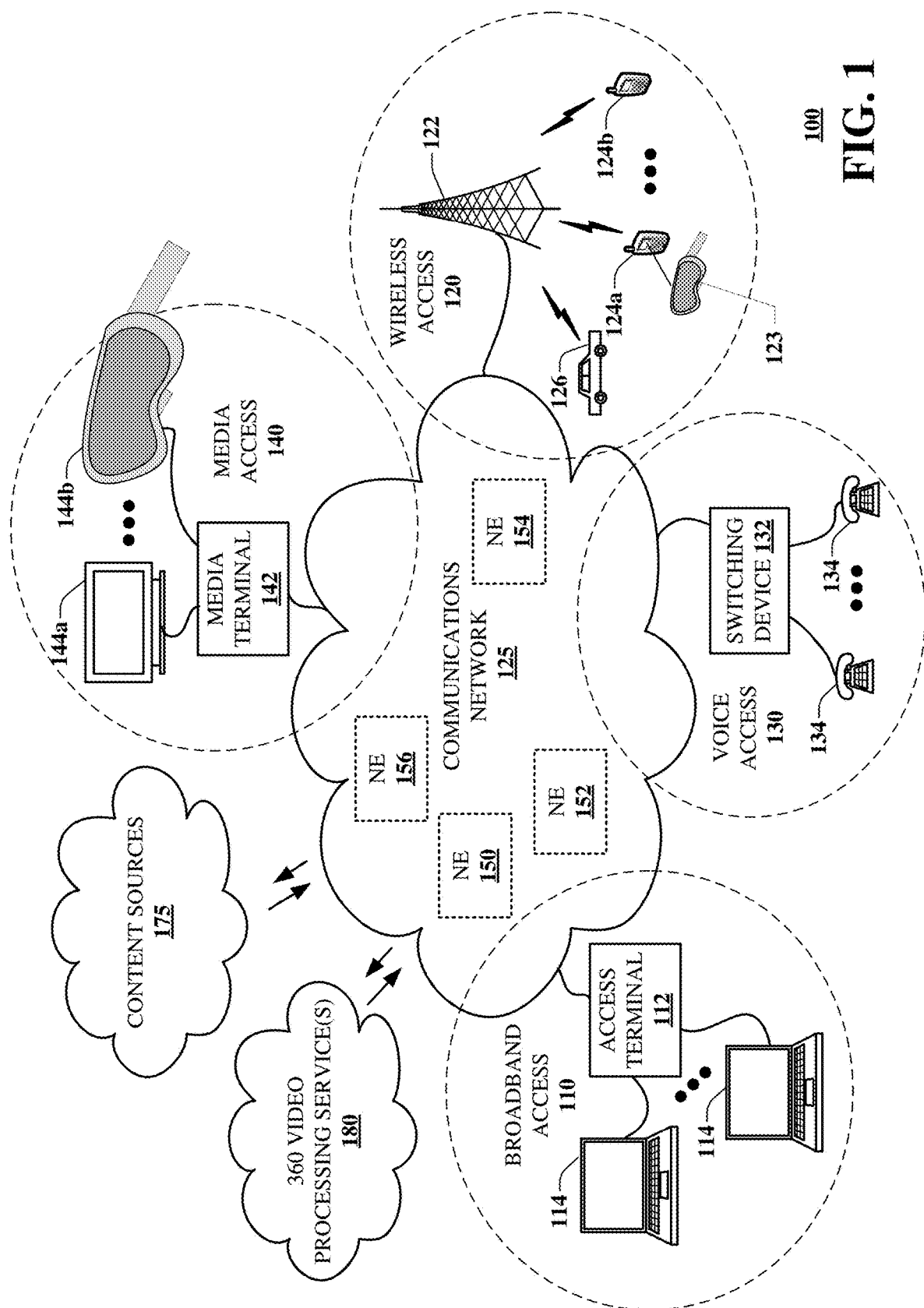
FIG. 1 is a block diagram illustrating an example, non-limiting embodiment of a communications network in accordance with various aspects described herein.

The subject disclosure describes, among other things, illustrative embodiments for determining an optimal segment size for a tile-based application of immersive video streaming. Other embodiments are described in the subject disclosure.

One or more aspects of the subject disclosure include a process, including determining, by a processing system including a processor, a field of view, wherein the field of view occupies a corresponding area within a first video frame of an immersive video content item. A reference data size variable is initialized, by the processing system, to an initial data size value, and a data size is determined, by the processing system. The determining of the data size includes tiling, by the processing system, a portion of the immersive video content item according to a tiling scenario, identifying, by the processing system, tiles of the tiling scenario that overlap the field of view to obtain overlapping tiles, encoding, by the processing system, the overlapping tiles to obtain encoded overlapping tiles, and determining, by the processing system, an updated data size based on a size of the encoded overlapping tiles. The updated data size is compared, by the processing system, to the reference data size variable to obtain a comparison result. Responsive to the comparison result indicating that the updated data size is less than the reference data size variable, the reference data size variable is reset, by the processing system, to the updated data size, the tiling scenario is adjusted, by the processing system, according to an adjusted tiling scenario, and the determining of the data size is repeated, by the processing system, based on the adjusted tiling scenario. Responsive to the comparison result indicating that the updated data size is not less than the reference data size variable, a preferred tiling scenario is identified, by the processing system, based on the adjusted tiling scenario, wherein the portion of the immersive video content item is segmented according to the preferred tiling scenario.

One or more aspects of the subject disclosure include a non-transitory, machine-readable storage medium that includes executable instructions, which, when executed by a processing system including a processor, facilitate performance of operations. The operations included identifying a field of view, wherein the field of view occupies a corresponding area within a first video frame of an immersive video content item. A reference data size variable is set to a current data size value and a data size is determined. The determining of the data size includes tiling a portion of the immersive video content item according to a tiling scenario, detecting tiles of the tiling scenario that overlap the field of view to obtain overlapping tiles, determining an updated data size based on a size of an encoded version of the overlapping, and comparing the updated data size to the reference data size variable to obtain a comparison result. Responsive to the comparison result indicating that the updated data size is less than the reference data size variable, the reference data size variable is adjusted to the updated data size, the tiling scenario is adjusted according to an adjusted tiling scenario, and the determining of the data size is repeated based on the adjusted tiling scenario. Responsive to the comparison result indicating that the updated data size is not less than the reference data size variable, a preferred tiling scenario is identified based on the adjusted tiling scenario, wherein the portion of the immersive video content item is segmented according to the preferred tiling scenario.

One or more aspects of the subject disclosure include a device, including a processing system having a processor and a memory that stores executable instructions that, when executed by the processing system, facilitate performance of operations. The operations included identifying a location of a field of view within a first video frame of a video content item, wherein the field of view occupies an area less than an entire area of the first video frame. A size is determined, wherein the determining of the size includes: subdividing a portion of the video content item according to a tiling scenario, detecting tiles of the tiling scenario that overlap the field of view to obtain overlapping tiles, determining an updated size based on a size of an encoded version of the overlapping tiles, and comparing the updated size to a reference size to obtain a comparison result. Responsive to the comparison result indicating that the updated size is less than the reference size: the reference size is adjusted to the updated size. the tiling scenario is adjusted according to an adjusted tiling scenario, and the determining of the size is repeated based on the adjusted tiling scenario. Responsive to the comparison result indicating that the updated size is not less than the reference size, a preferred tiling scenario is identified based on the adjusted tiling scenario, wherein the portion of the video content item is segmented according to the preferred tiling scenario.

The present disclosure determines an efficient, e.g., an optimal, segment size for tile-based 360-degree video streaming. Usually, a video player renders or displays only the visible portion of a 360 video. Thus, fetching an entire raw video frame, which is the current practice of the-state-of-the-art 360 video players, wastes bandwidth and makes the delivery of high-resolution 360 videos challenging. Approaches that segment 360 videos into tiles can potentially save or otherwise conserve delivery bandwidth by sending tiles that overlap with a Field of View (FoV) of equipment of users. Tiles that do not overlap with the FoV may not be sent and/or may be sent with a lower resolution.

The FoV may have a shape that is rectangular, but more likely would be some other shape, e.g., depending on one or more of video player equipment, mapping, user selections, such as zoom, and the like. Accordingly, a rectangular segmentation or tiling may not be capable of providing a perfect overlap or fit to the FoV. Even if a perfect fit were possible, a particular location of the FoV could be anywhere, e.g., based on a view of the user, such that some tiles only partially overlap the FoV. In selecting those segments or tiles that overlap a FoV, there will remain some excess portion of those tiles along an edge of the overlapping area that would not be visible by a viewer. It can be appreciated that further bandwidth savings can be achieved by minimizing and/or eliminating such tiling inefficiency.

Using a relatively fine-grained segmentation with a small tile size can reduce the portion of a 360 video that will be delivered to users. However, small tiles would tend to have a lower video encoding efficiency compared to larger tiles, as the larger tiles have more opportunities to compress redundant information within them. Thus, there exists a segmentation scheme that can reduce a bandwidth usage of 360 video streaming. In some instances this can include a so-called optimal segmentation scheme that minimizes bandwidth usage. In some embodiments a preferred or optimal segment and/or tile size can be determined by leveraging a predetermined path of FoVs for 360 videos. By way of non-limiting example, the predetermined path can include a preferred path, such as a default path established by a creator of the 360 video and/or a most-frequently-visited path of FoVs for 360 videos based on historical observations of past views. Using the optimal segmentation for 360 video deliveries can not only further reduce the bandwidth requirement of tile-based streaming, but also increase the video resolution and thus improve the quality of user experience under the same network condition.

Referring now to FIG. 1, a block diagram is shown illustrating an example, non-limiting embodiment of a communications network 100 in accordance with various aspects described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144a, 144b, generally 144, via media terminal 142. In at least some embodiments, the video/display device includes a 360 video player that displays portions of a 360 video based on a position of the FoV. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media. It is understood that the content sources 175 can include of 360 video content, including raw 360 video content and/or 360 video content processed according to the techniques disclosed herein. For example, the content sources 175 can provide pre-segmented and/or pre-tiled 360 video served to 360 video players 144b over the communications network 125 according to a streaming media protocol. Alternatively or in addition, the content sources 175 can provide 360 video that may not be pre-segmented or tiled, e.g., raw 360 video. In at least some instances, other media processing services 180 access the raw 360 video, process it according to the techniques disclosed herein to obtain a segmented and/or tiled version of the 360 video. The processing services 180, in turn, can serve segments or tiles of the processed 360 video to med a terminals 142 and/or display devices 144a, 144b, according to the techniques disclosed herein.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
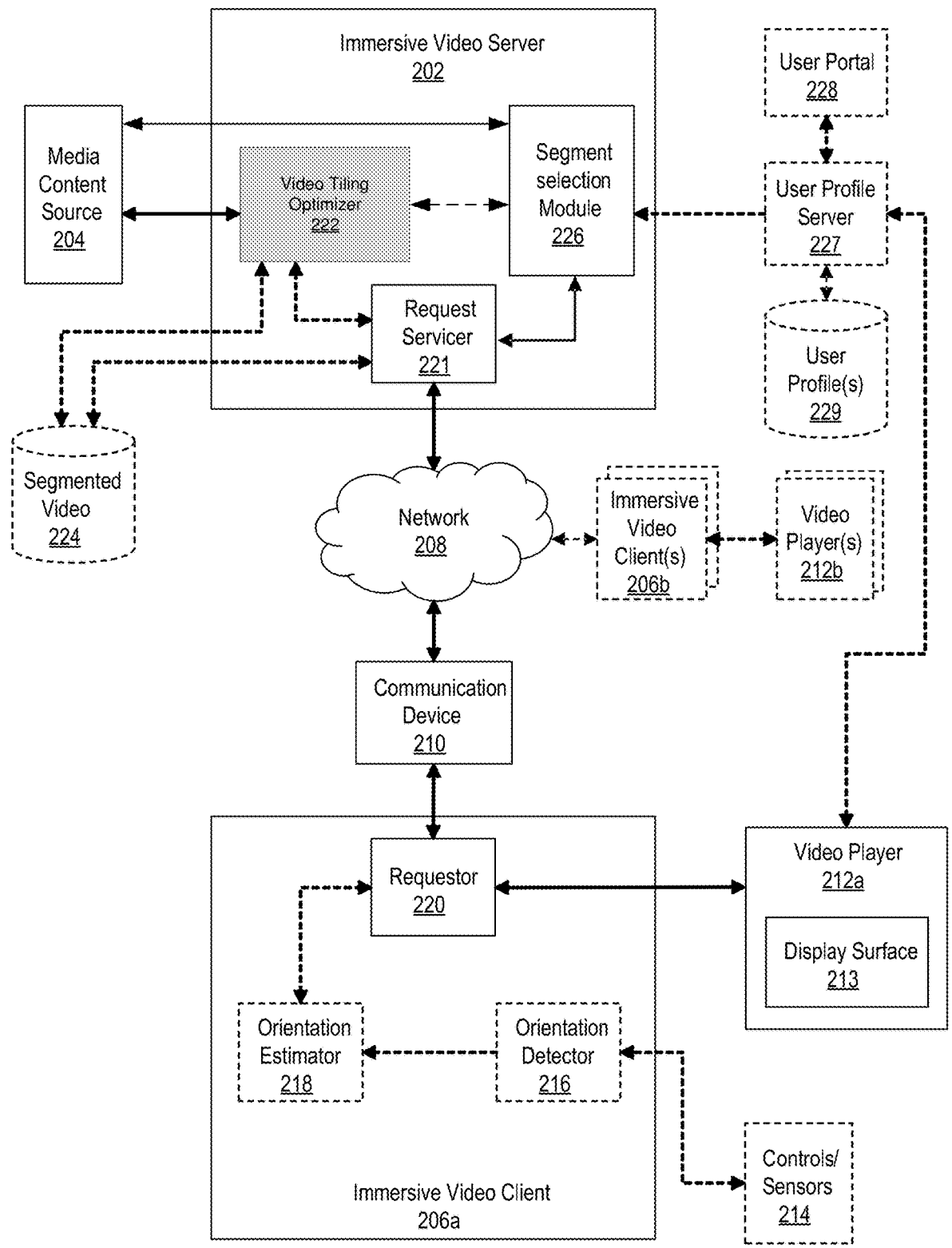
FIG. 2A is a block diagram illustrating an example, non-limiting embodiment of an immersive video processing system functioning within the communication network of FIG. 1 in accordance with various aspects described herein.

FIG. 2A is a block diagram illustrating an example, non-limiting embodiment of an immersive video processing system 200 functioning within the communication network of FIG. 1 in accordance with various aspects described herein. The system 200 includes an immersive video server 202 in communication with a video content source 204. The video content sources 204 provides immersive video content, such as 360-degree video media items, panoramic video media items, stereo video media items, 3D video media items, and the like. The immersive video server 202 is in further communication with an immersive video client 206 via a transport network 208.

In the illustrative example, the transport network 208 includes a wireless mobile network, such as a cellular network. It is understood that the transport network 208 can include, without limitation, one or more wireless networks, such as, mobile cellular networks, WiFi networks, satellite networks, terrestrial radio networks, and the like. Alternatively or in addition, the transport network 208 can include one or more wired network, such as Ethernet, SONET, circuit-switched network components, e.g., SS7, cable, and the like. Although the example transport network 208 is illustrated by a single cloud, it is understood that the network 208 between the immersive video server 202 and the immersive video client 206 can include one or more networks of the same, similar and/or different configurations, e.g., combinations of wired and wireless, terrestrial, satellite, and the like.

Continuing with the illustrative example, the immersive video client 206 is in network communication with the transport network 208 by way of a communication device 210. The communication device 210 can include, without limitation, any of the various devices disclosed herein or otherwise generally known to those skilled in the art of communications, such as personal computers, smart TVs, mobile telephones, tablet devices, laptops, telephone handsets, and the like. In a context of machine-to-machine (M2M) communications, e.g., according to an Internet of Things (IoT) paradigm, the mobile device 210 can include a machine, such as an appliance, a vehicle and the like.

The immersive video client 206 is in further communication with an immersive video player or viewer 212a. In at least some embodiments, the immersive video client 206 is in further communication with one or more controls and/or sensors 214 (shown in phantom). For example, the sensor 214 can include an inertial sensor, such as an accelerometer, that can detect and/or estimate a position and/or a change in position of the display surface 213 of the video player 212a. Sensors 214 can include those commonly found in smart phones and/or tablet devices. It is understood that in at least some embodiments, the sensors 214 can be internal to and/or otherwise attached to the video player 212 and/or the display surface 213. Accordingly, the sensors 214 can detect position and/or orientation of the display surface 213 based on the physical orientation and/or change in orientation of the video player 212a. Alternatively or in addition, the sensors 214 can be separate from the video player 212a. For example, the sensors 214 can include one or more of a motion sensor and/or a video sensors adapted to detect motion and/or position of the video player 212a. In at least some embodiments, a position and/or orientation of the display surface 213 of the video player 212a can be inferred or otherwise determined from a predetermined configuration of the display surface 213 within the video player 212a.

The example immersive video client 206 includes a requestor 220 that requests immersive video content for display by the video player 212a. In at least some embodiments, the immersive video client 206 can optionally include an orientation detector 216 and/or an orientation estimator 218 (shown in phantom). The orientation detector 216, when provided, is in communication with the sensors 214 and adapted to determine an orientation of the video player 212a, or more particularly, of a display surface 213 of the video player 212a based on sensor data obtained from the sensors 214.

The orientation of the video player 212a and/or display surface 213 can include, without limitation, a first direction, such as an azimuth angle and a second direction, such as an elevation angle. The azimuth angle and elevation angle, taken together can define a pointing direction of a normal to the display surface 213. In at least some embodiments, the azimuth angle and elevation angle can be further combined with a twist or rotation angle that further defines a rotational orientation of the display surface 213 with respect to the pointing direction.

In at least some embodiments, an orientation and or position of the display surface 213 can be defined in reference to a center of a coordinate system. Example coordinate systems can include spherical coordinate systems, cylindrical coordinate systems, polar coordinate systems, Cartesian coordinate systems and the like. By way of example, the orientation or position of the display surface 213 can be defined by rotations about orthogonal axis, such as rotations about x, y and z axes of a rectangular coordinate system. These angles are sometimes referred to as pitch, yaw and roll.

In at least some embodiments, the immersive video server 202 includes a request servicer 221 and a v video tiling optimizer 222, sometimes referred to as a video segment optimizer or video tiling optimizer 222. The example video tiling optimizer 222 is in communication with the video content source 204, and adapted to segment or tile at least a portion of an immersive video media item obtained from the video content source 204 into a plurality of segments and/or tiles including spatial segments, tiles or sub-regions. For example, the video tiling optimizer 222 can divide an immersive video frame into a number of segments, tiles, sub-regions or sub-frames. Without limitation, the shape of segments, tiles or sub-regions can be uniform. It is understood that shapes of the segments, tiles and/or sub-regions can be rectangular and/or other shapes. The shapes of the segments can be regular, irregular, uniform and/or different. Tile shapes can include, without limitation, rectangles, squares, triangles, or more generally regular and/or irregular polygons.

The FoV position or orientation estimator 218, when included, provides an indication of an estimated position and/or orientation to the requestor 220. The requestor 220, in at least some embodiments, can be adapted to determine other information, such as a field-of-view of the video player 212a and/or display surface 213. The field-of-view can be defined according to one or more of spatial dimensions on a mapped surface, angular ranges and/or pixel ranges. It is understood that in at least some embodiments, that the field of view may differ according to one or more of orientation, e.g., looking down versus straight ahead, a type of projection used in association with the immersive video frame, and so on.

In at least some embodiments, the requestor 220 receives an indication and/or is otherwise pre-configured with information describing how the segmentation/sub-regions are/ have been applied to the immersive video frames. Together with the determined and/or estimated position/orientation and the size of the FoV, the requestor 220 can determine which segments/sub-regions will fall in and/or near the display surface 213.

In at least some embodiments, the delivery time can be selectable and/or variable. For example, the delivery time can be based on one or more of data transfer size and/or bandwidth, network conditions, subscription levels, quality of experience, and the like. It is understood that network bandwidth and/or latency can depend upon network conditions, such as congestion, interference, signal propagation loss, and the like. Accordingly, the delivery time can be based upon an estimate of a difference between a time at which a request is made by the requestor 220 and a time at which the requested segments/regions are of a requested segment size are delivered to the immersive video client 206a. Other delays can be factored into this determination, such as processing delays of one or more of the immersive video client, the video player 212a and/or the immersive video server 202.

The request servicer 221 is in communication with the requestor 220 via a network, such as the transport network 208. The requestor 220 submits a request for 360 video, in at least some embodiments, the request includes a position of the FoV, sometimes revered to as a particular view, e.g., depending on a position of the viewer's line of sight or gaze. Alternatively or in addition, the requestor 220 submits a request for a particular group of segments or sub-regions of a particular immersive video frame based on the particular view. The request servicer 221 receives the request and responds by facilitating transfer of the requested segments/ sub-regions via the transport network 208. For applications in which the request servicer 221 receives the view and not necessarily the particular tiles or segments, the request servicer 221 determines which tiles or segments correspond to the particular view.

It is understood that the request servicer 221 can service a single request by sequential, e.g., serial, delivery of individual segments of the requested group, and/or contemporaneous, e.g., parallel, delivery of multiple segments of the requested group. In at least some embodiments, individual requests can be made and processed according to each subsequent video frame of an immersive video media item. Alternatively or in addition, the processing can be applied to groups of frames. For example, a single prediction can be made at a prediction time, and then used to process more than one frame of the immersive video media item. In some instances, multiple frames include separate frames of a stereo and/or 3D immersive video media item, e.g., left and right frame components. In at least some embodiments, the same request is made for successive video frames of an immersive video media item. This can provide some relief to the processing and cut down on overhead, possibly at a sacrifice of accuracy, due to increased estimate times.

In some embodiments, the segment selection module 226 is configured to determine and/or otherwise access historical records and/or statistics based on prior requests that can be used, in turn, by one or more of the request servicer 221, the video tiling optimizer 222, the requestor 220 and/or the orientation estimator 218. For example, statistics can be used to track requests received from multiple immersive video clients 206a, 206b (generally 206) and or video players 212a, 212b (generally 212). The statistics can associate past requests with one or more of immersive video media item. It is envisioned that some regions of an immersive video frame may be requested more than others based on a nature of the immersive video media item content. Accordingly, segments can be associated with a frequency, based on past requests. A so-called "heat map" of content viewing frequencies can be generated from crowdsourced statistics based on past viewing frequencies of the different tiles. Tiles determined to have a higher viewing frequency, e.g., by the heat map, may be more likely to be viewed in a current viewing session. Alternatively or in addition, the segment selection module 226 can associate one or more of network conditions, time of day, day of week, service level, requestor profile, region, demographics and the like. Statistics can be determined according to one or more of the example parameters and used in association with subsequent requests to improve system performance by reducing errors, reducing quantities of invisible segments as may be associated with requests to manage errors and so on.

In at least some embodiments, the shapes can be adapted or otherwise selected based on one or more of the nature of the immersive video frame, the display surface, one or more projection algorithms as may be applied and so on. For example, the shapes can correspond to one or more of a shape of the field of view, a shape of a primary viewing region, a shape of an object depicted within the video, a mapping scheme, e.g., of the 3D space to a 2D reference frame, and the like. For a spherical projection of a 360-degree video, the sub-regions can be portions of a spherical surface, e.g., defined according to a spherical coordinate system. Alternatively or in addition, the sub-regions can be portions of a cylindrical surface and/or portions of a rectangular surface. Even though the projected surface portrayed in the immersive video frame may confirm to a particular geometry, it is understood that the shape and/or size of the segments and/or sub-regions can be the same, similar and/or different. For example, the segments and/or sub-regions can be determined according to a projection algorithm, e.g., mapping a spherical surface to a cylindrical and/or rectangular surface.

By way of example, each frame in a 360 degree video can be represented as a 2D image using an equi-rectangular projection. According to the illustrative techniques, the equi-rectangular presentation can be subdivided into multiple regions. The division can be done in various ways. For example, the projection or map can be divided uniformly into identical rectangles. That is, an equi-rectangular presentation of a 360 degree video frame may be divided up into rectangular regions with substantially identical areas. It is understood that other types of projections can be applied to the various techniques disclosed herein. For example, projections such as transverse Mercator, Mercator, Lambert, etc., are possible and contemplated herein. Alternatively, pseudo-cylindrical, azimuthal, or conic projections are also considered possibilities.

It is generally understood that segmentation of an immersive video media item can be performed in real time or near-real time, e.g., in association with and/or responsive to a particular request from a requestor 220 of a particular immersive video client 206. Alternatively or in addition, segmentation can be performed beforehand, e.g., offline, and stored for later use. In some embodiments, segmentation data alone or in combination with a segmented version of the immersive video media item can be stored in an optional segmented video repository 224 (shown in phantom).

Segmentation or tiling data can include, without limitation, a segment or tile size, a segment or tile shape, a segment or tile dimension, an aspect ratio, a temporal segment size, e.g., 1 second of video and/or a number of sequential video frames to be processed as a unit, a segment or a "chunk," identification of particular tiles and/or segments and/or sub-regions of a segmented immersive video media item, and so on. For example, this can include individually addressable segments, e.g., segment (i, j) of an M×N array of segments of a particular immersive video frame. As immersive video media items can include arrays of immersive video frame, it is understood that a common segment referencing and/or indexing scheme can be applied to more than one, e.g., all, frames of a particular immersive video media item. Accordingly, segments and/or sub-regions can be identified and addressed independently and/or collectively in groups. Groups of segments and/or sub-regions can conform to a particular shape, e.g., a contiguous shape, such as a rectangle, an oval, and the like. Alternatively or in addition, segments and/or sub-regions can be addressed according to ranges.

In at least some embodiments, the immersive video server 202 includes a segment selection module 226. The example segment selection module 226 is in communication with the video tiling optimizer 222. In some embodiments the segment selection module 226 is in further communication with one or more of the request servicer 221, and the media content source 204. In operation, the segment selection module 226 identifies a group of tiles or segments of an immersive video frame, and/or video chunk consisting of a group of multiple frames. The identified group of tiles or segments can be shared with the video tiling optimizer 222, which obtains the identified group of segments from the media content source 204 and/or from the segmented video repository 224.

By way of illustrative example, the tile or segment selection module 226 can be configured to identify those tiles and/or segments that overlap with a particular FoV. In some embodiments, the particular FoV can be determined based on a predetermined FoV. Predetermined FoVs can include, without limitation, a path of most frequently viewed FoVs and/or a default path of a viewing window as might be identified by a creator of the 360 video, a critic, a reviewer, a peer, and so on. Alternatively or in addition, the segment selection module 226 identifies overlapping tiles or segments based on a position of the equipment of a particular viewer, e.g., as received from the requestor 220 by way of the request servicer 221. Although the segment selection module 226 is illustrated as an independent module, it is understood that related functionality can be incorporated within one or more other modules, such as the request servicer 221 and/or the video tiling optimizer 222.

In some embodiments, the video tiling optimizer 222 determines optimal tile and/or segment size in an offline manner. For example, the video tiling optimizer 222 process a 360 video file from the media content source 206 based on one or more of the various predetermined views disclosed herein. Results of the video tiling optimization processing can include, without limitation, an optimal tile or segment size. Alternatively or in addition, the results can include a modified 360 video file tiled or segmented according to an identified optimal tile or segment size. Results of offline processing, e.g., the optimal tile size and/or the optimally tiled or segmented 360 video can be stored in a segmented video repository 224 for serving subsequent requests.

It is envisioned that the optimizing process can be repeated at other times to update the results. In some embodiments, such repetitions can be scheduled periodically, e.g., monthly, quarterly, seasonally, yearly and so on. Alternatively or in addition, such repetitions can be scheduled according to viewing records. For example, results can be updated after some predetermined number or views. As historical viewing records are tracked, it is conceivable that tile-viewing frequency data of a heat map may change and lead to a different optimized solution.

Alternatively or in addition, the optimizing process can be repeated based on subsequent requests. Consider a situation in which a new 360 viewer device and/or client becomes available. It is conceivable that a different viewer device 360 may have a different FoV size, which when processed, would likely lead to different results, as the overlapping tiles would differ based on the different size. In some embodiments, requests may be received from a particular viewer, a particular reviewer, a content provider, and the like, based on a FoV path that may differ from an earlier predetermined path. For example, a reviewer may have noticed certain items of interest in the 360 video file that occur in different areas than those associated with the most frequently viewed or default paths. A new alternative path identified by the reviewer can be processed according to the techniques disclosed herein and made available for subsequent views. As a reviewer may publish his/her findings and/or recommendations, it is conceivable that request for subsequent views may comply with the recommenders viewing path.

In at least some embodiments tiling or segmentation can be performed in on the fly and/or in response to a viewing request. Consider a scenario in which a 360 video viewing request is received for a particular 360 video file that has yet to be tiled, segmented and/or optimized for transport. In some embodiments, the request can be processed by first completing a tiling, segmentation and/or optimization of the entire 360 video file. Alternatively or in addition, the request can be processed by implementing the tiling, segmentation and/or optimization for sequential portions of the 360 video file. For example, the processing can be accomplished for sequential temporal segments, e.g., 1-minute segments, a particular number of frames, according to scenes and/or chapters of the 360 video file, and so on. In at least some embodiments, the sequential temporal segments are determined according to metadata of the 360 video file, e.g., identifying scenes, content, commercial breaks, and the like. The results of on-the-fly processing can be transported to a requesting viewer with or without being stored or otherwise retained, e.g., in the segmented video repository 224 for subsequent requests.

In at least some embodiments, the tiling, segmentation and/or optimization can be accomplished in parallel. Namely, a 360 video file can be divided into different sections that can be tiled, segmented and/or optimized independently. Such independent processing allows functions of the one or more modules, such as the segment selection module 226 and/or the video tiling optimizer 222 to be duplicated to allow simultaneous processing. In some embodiments, the different sections are determined temporally, e.g., according to a set play time, e.g., 1-minute, 5-minute, 10-minutes and so on. Alternatively or in addition, the different sections are determined according to different resolutions, e.g., standard display resolutions, such as standard-definition TV (SDTV), enhanced-definition TV (EDTV), high-definition TV (HDTV), and/or ultra-high-definition TV (UHDTV).

Alternatively or in addition, the resolution differentiation can be based on video, streaming and/or transport encoding.

If a request can be submitted in advance, e.g., by way of a reservation, then the tiling, segmentation and/or optimization can occur in an offline manner as disclosed above, the difference being that the process was initiated in response to the particular request. As it is envisioned that individuals may create 360 or immersive videos, the request may be associated with a publisher of the content. Once tiled, segmented and/or optimized, the processed immersive video content can be shared and/or served as disclosed herein. It is further conceivable that personal immersive videos can be shared using social media applications, email, personal web pages, peer-to-peer sharing groups, and the like.

In some embodiments, an immersive video client 206 includes a viewing direction, position, and/or orientation detector 216 that determines actual and/or estimated directions, positions, and/or orientations of the video player and/or display surface 213, based on input from the sensors 214. Actual orientations are provided to the orientation estimator 218, which, in turn, estimates a direction, position and/or orientation of the video player 212 and/or the display surface 213. In at least some embodiments, the orientation estimator 218 predicts a future directions, position and/or orientations of the field of view, e.g., as disclosed in U.S. patent application Ser. No. 15/828,994, filed on Dec. 1, 2017, entitled "Selective Streaming of Immersive Video Based on Field-Of-View Prediction," and incorporated herein by reference in its entirety. One or more of the field of view size, direction, position, orientation and/or estimation can be provided to the request servicer 221 and shared with one or more of the video tiling optimizer 222 and/or the segment selection module 226. For example, the segment selection can be based on the immersive video content itself in combination with one or more of the field of view size, orientation and/or prediction.

In some embodiments, the segment selection module 226 can access user information. For example, user information can be obtained from a user profile, e.g., stored and/or otherwise maintained in a user profile repository 229. The example system 200 includes an optional user profile server 227 in communication with one or more of a user profile repository 229 and a user portal 228 (shown in phantom). The segment selection module 226 can base selection of a group of segments on user information according to any of the various techniques disclosed herein. For example, the age of a user can be used to facilitate identification of objects of interest. Younger viewers may be more drawn to colors, whereas older viewers may be more drawn to movement, and/or image complexity. Still other viewers may be drawn to various immersive video content features based on one or more of content of the immersive video, age, gender, past viewing history, past immersive viewing history, expressed interests, e.g., sports, drama, and so on. e.g., as disclosed in U.S. patent application Ser. No. 15/901,609, filed on Feb. 21, 2018, entitled "System and Method of Predicting Field of View for Immersive Video Streaming," and incorporated herein by reference in its entirety.

The request servicer 221 is in communication with the requestor 220 via the transport network 208. The requestor 220 submits a request for immersive video content. The request can be in the form of a general request for the immersive video media content item. Alternatively or in addition, the request itself can identify a group of segments or sub-regions of a particular immersive video frame. The request servicer 221 receives the request and responds by facilitating transfer of the requested segments/sub-regions via the transport network 208, without necessarily providing all of the segments of any particular immersive video frame. This results in savings of one or more of bandwidth, processing memory or storage, etc.

It is understood that the request servicer 221 can service a single request by sequential, e.g., serial, delivery of individual tiles and/or segments of the requested group, and/or contemporaneous, e.g., parallel, delivery of multiple tiles and/or segments of the requested group. In at least some embodiments, individual requests can be made and processed according to each subsequent video frame of an immersive video media item. Alternatively or in addition, the processing can be applied to groups of frames. For example, a single prediction can be made at a prediction time, and then used to process more than one frame of the immersive video media item. In some instances, multiple frames include separate frames of a stereo and/or 3D immersive video media item, e.g., left and right frame components. In at least some embodiments, the same request is made for successive video frames of an immersive video media item. This can provide some relief to the processing and cut down on overhead, possibly at a sacrifice of accuracy, due to increased estimate times.

In some embodiments, the video tiling optimizer 222 is not in communication with a request servicer 221. Rather, the video tiling optimizer is in communication with the media content source 204 and the segmented video repository 224. In such applications, the video tiling optimizer processes an immersive media content item in an offline manner, storing a result in the segmented video repository 224. The stored result can include storage of the overlapping tiles at the preferred tile size or resolution. Subsequent requests received by the request servicer 221 can be obtained from one or more of the media content source 204, the segmented video repository 224 or the segment selection module 226. When tiles of a preferred path, e.g., most frequently viewed path or a default path, servicing of a request can be accomplished without the segment selection module 226.

Figure 2B:
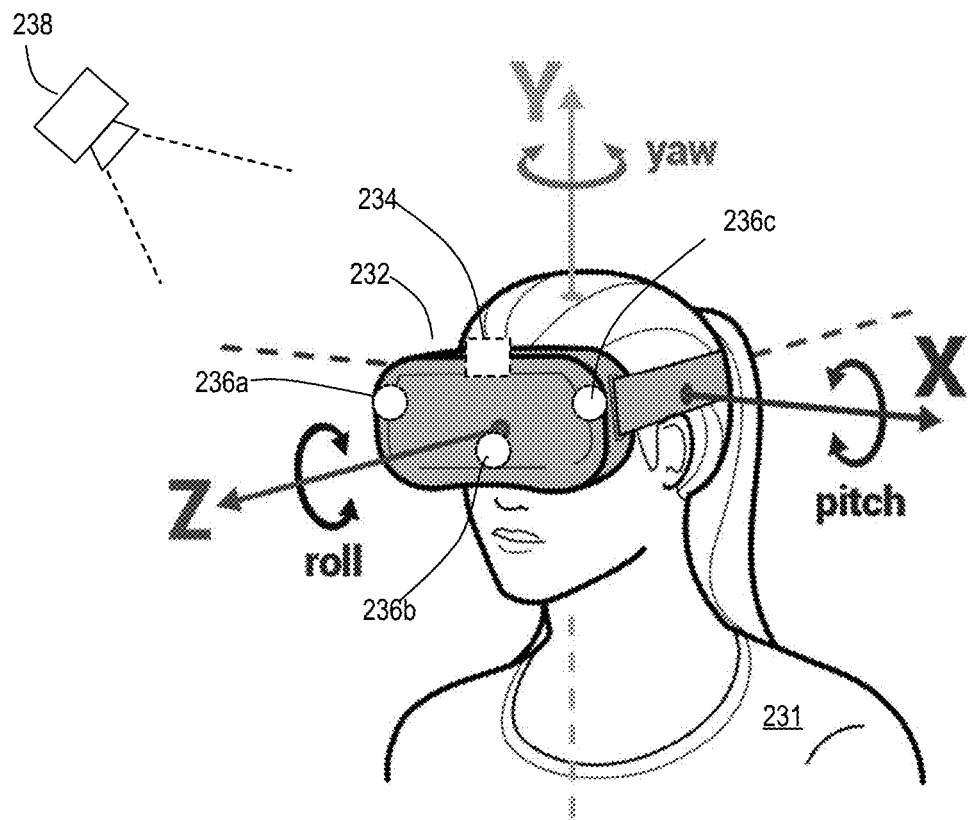
FIG. 2B is a block diagram illustrating an example, non-limiting embodiment of an immersive video viewing system functioning within the communication network of FIG. 1 and the immersive video processing system of FIG. 2A in accordance with various aspects described herein.

FIG. 2B is a block diagram illustrating an example, non-limiting embodiment of an immersive video viewing system functioning within the communication network of FIG. 1 and the immersive video processing system 200 of FIG. 2A in accordance with various aspects described herein. When watching an immersive, e.g., 360-degree, video, a viewer 212 at a center of an immersive video media presentation, e.g., at a spherical center, can freely control her viewing direction, so each playback creates a unique experience. As shown in FIG. 2B, a user 231 wearing a VR headset 232 can adjust her orientation by changing the pitch, yaw, and/or roll of the VR headset 232, which correspond to rotating along one or more of the X, Y, and Z axes, respectively. Then a 360 video player, e.g., within the VR headset 232, computes and displays a viewing area, i.e., a display surface, based on the orientation and FoV. The FoV can define an extent of the observable area, which is usually a fixed parameter of a VR headset (e.g., 110° horizontally and 90° vertically).

In at least some embodiments, the example VR headset 232 can be equipped with a position and/or orientation sensor 234, such as position/orientation sensors available on smartphones, gaming goggles and/or tablet devices. Alternatively or in addition, the VR headset 232 includes one or more reference markers 236a, 236b, 236c (generally 236). The reference markers 236 are spaced apart in a predetermined configuration. An external sensor, such as a video camera 238, is positioned to observe the FR headset 232 during active use. The external sensor 238 detects positions of the reference markers 236. Further processing, e.g., by an orientation detector 216 (FIG. 2A) can determine a position and/or orientation of the VR headset 232 based on the detected/observed positions of the reference markers 236.

Such immersive videos are very popular on major video platforms such as YOUTUBE® and FACEBOOK® platforms. Despite their popularity, the research community appears to lack an in-depth understanding of many of its critical aspects such as performance and resource consumption. The disclosure provided herein is intended to fill this gap by investigating how to optimize immersive video delivery over wireless mobile, e.g., cellular, networks, which are anticipated as forming a key infrastructure that facilitates ubiquitous access of network accessible VR resources, e.g., in the cloud. Measurements were conducted on two commercial 360-degree video platforms: YouTube and Facebook to obtain an understanding the state-of-the-art of 360-degree video delivery. To a large extent, 360 video inherits delivery schemes from traditional Internet videos. This simplifies the deployment, but makes 360-degree video streaming very cellular-unfriendly, because the video player always fetches the entire video including both visible and invisible portions. This leads to tremendous resource inefficiency on cellular networks with limited bandwidth, metered link, fluctuating throughput, and high device radio energy consumption.

As an important component of the virtual reality (VR) technology, immersive videos provide users 231 with panoramic views allowing them to freely control their viewing direction during video playback. Usually, a video presentation system or a headset 232 displays only the visible portion of an immersive video. Thus, fetching the entire raw video frame wastes bandwidth. The techniques disclosed herein address the problem of optimizing immersive video delivery over wireless, e.g., cellular, networks. A measurement study was conducted on commercial 360 video platforms. A cellular-friendly streaming scheme is disclosed that delivers only a 360 video's visible portion based on head movement prediction. Viewing data collected from real users was used to demonstrate feasibility of an approach that can reduce bandwidth consumption by up to 80% based on a trace-driven simulation.

Conceptually, a novel cellular-friendly streaming scheme for immersive videos avoids downloading an entire immersive video, instead only fetching those parts, e.g., spatial segments or portions, of the immersive video that are visible to the user 231 in order to reduce bandwidth consumption associated with the video transfer. As display of any of the portion of the immersive video requires that the portion be fetched or otherwise downloaded, the disclosed approach benefits from a prediction of a viewer's head movement (to determine which portion of the immersive video view to fetch). Five users' head movement traces were collected when watching real YouTube 360 videos. Trace-driven analysis indicated that, at least in the short term, a viewers' head movement can be accurately predicted, e.g., with an accuracy >90%, by even using simple techniques such as linear regression. Design considerations include handling prediction errors and integration with Dynamic Adaptive Streaming over HTTP (DASH) and HTTP.

Examples of popular video platforms include, without limitation, YouTube and Facebook. For example, a YouTube app or Facebook can be used to view 360 videos on a smartphone, such as a Samsung Galaxy phone running Android, and/or a Chrome browser on a Windows 10 laptop using a Chrome debugging tool to analyze HTTPS transactions, and/or redirecting traffic during video playback to a "man-in-the-middle" proxy (using mitmproxy).

Figure 2C:
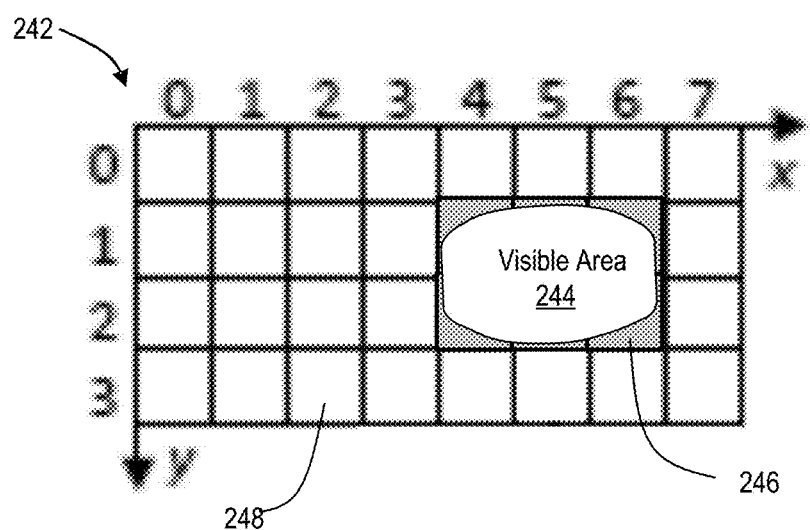
FIG. 2C is a schematic diagram illustrating an example, non-limiting embodiment of a raw frame of immersive video functioning within the immersive video processing system of FIG. 2A and viewable by the immersive video viewing system of FIG. 2B in accordance with various aspects described herein.

FIG. 2C is a schematic diagram illustrating an example, non-limiting embodiment of a tiled or segmented frame 242 of immersive video functioning within the immersive video processing system 200 of FIG. 2A and viewable by the immersive video viewing system 230 of FIG. 2B in accordance with various aspects described herein. In the illustrative example, the tiled or segmented rectangular frame 242 is subdivided into multiple sub-segments or tiles 248. In the particular example, the video frame 242 is subdivided into a 4×8 array of rectangular tiles or subsegments 248. Also illustrated is an example visible area 244 of the immersive video viewing system 230. The visible area 244 is superimposed over the tiled or segmented video frame 242 based on a location. The location can be according to any of the various techniques disclosed herein, such as a predetermined default view, a predetermined frequently viewed location based on a heat map, and/or an actual or estimated view of a particular viewing system 230, e.g., based on a position of a head of a viewer. Also illustrated are a subset of the tiles 248 that overlap the FoV area 244, referred to as overlapping tiles 246. Shading of the overlapping tiles 246 illustrates those portions of the overlapping tiles that will not be visible based on the location of the visible area 244, thereby representing waste to the extent they are transported to the viewer.

Figure 2D:
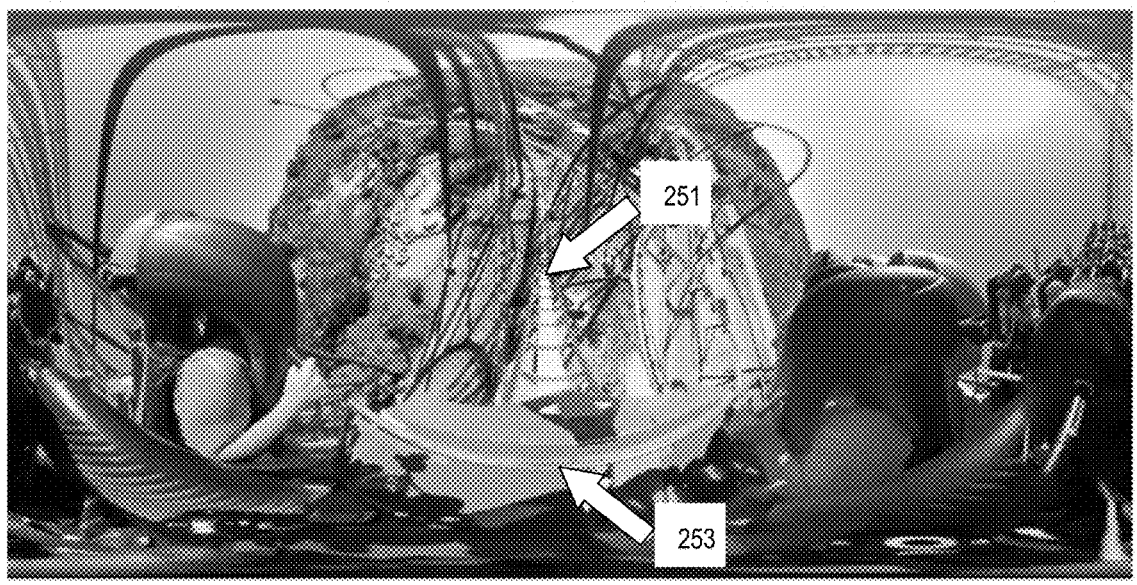
FIG. 2D is an image illustrating an example, non-limiting embodiment of a raw frame of immersive video functioning within the immersive video processing system of FIG. 2A and viewable by the immersive video viewing system of FIG. 2B in accordance with various aspects described herein.
Figure 2E:
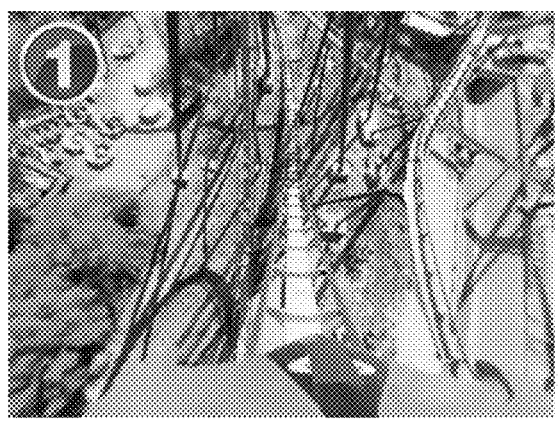
FIG. 2E is an image illustrating an example, non-limiting embodiment of a central viewable area of the raw frame of immersive video of FIG. 2D.
Figure 2F:
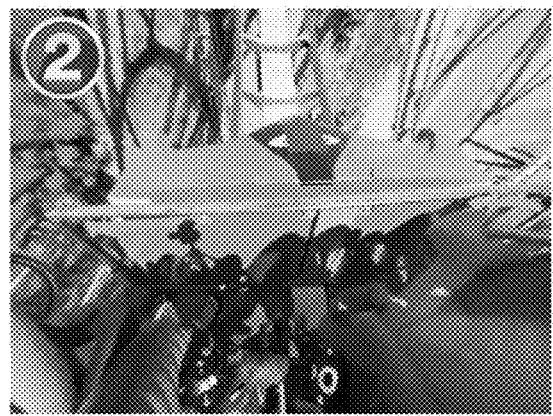
FIG. 2F is an image illustrating an example, non-limiting embodiment of a lower viewable area of the raw frame of immersive video of FIG. 2D.

FIG. 2D is an image illustrating an example, non-limiting embodiment of a raw frame 250 of immersive video functioning within the immersive video processing system 200 of FIG. 2A and viewable by the immersive video viewing system 230 of FIG. 2B in accordance with various aspects described herein. Both YouTube and Facebook presently encode 360 videos into a standard H.264 format in an MP4 container. It is understood that a 360 video can be playable in conventional media players, e.g., only showing raw frames as exemplified by a large image 250 in FIG. 2D. As shown, the raw frame 250 is distorted because it was projected from the 3D panoramic sphere. When a viewing area of a virtual reality headset is determined, the visible portion is then reversely projected from the raw frame to the screen, as illustrated by the two smaller images 251, 252 shown in FIG. 2E and FIG. 2F, respectively.

The raw video frames of the different 360 sources, e.g., YouTube and Facebook, exhibit different visual "patterns" based on their use of different projection algorithms. For example, YouTube was found to employ an equi-rectangular projection that directly uses the latitude and longitude on a sphere as the vertical and horizontal coordinates, respectively, on the raw frame. Facebook was found to employ a different projection scheme, referred to as Cube Map that offers less distortion in the polar areas of the sphere.

Both YouTube (on Android app) and Facebook (on Chrome for Windows 10) use progressive download over HTTP, a widely used streaming technique, to deliver 360 videos. Progressive download allows a client to start playing the video before it is fully downloaded. It is realized using HTTP byte range request.

Both video platforms support multiple encoding bitrates for 360 videos. The viewer can switch between standard definition (SD) and high definition (HD) versions on Facebook. YouTube provides up to 8 bitrate levels from 144s to 2160s. Note the video quality numbers refer to the resolution of the entire raw frame 250 FIG. 2D, in which the viewer only sees a small portion at any given time, e.g., a first portion 251 depicted in the image 251 of FIG. 2E or a second portion 253 depicted in the image 252 of FIG. 2F. Therefore, to achieve the same user-perceived playback quality, the raw frame quality of a 360 video has to be much higher than that of a non-360 video. For a decent user experience, a 360 video can be streamed at at least 1080s, whereas, a reasonable quality for conventional videos can be less, e.g., 480p. However, when watching the video in FIG. 2D under 480s, the quality can be unacceptably bad, e.g., depending upon the viewing angle, because the VR headset 232 (FIG. 2B) in fact has a stretched view of a subarea of a 480s frame.

Improved techniques for immersive video streaming over cellular networks disclosed herein reduce bandwidth consumption, preferably with little or no detrimental effects to playback observed by a VR headset 232 (FIG. 2B). Basically, instead of downloading everything, a client 206 fetches the parts that are visible to the user. In some embodiments, immersive video regions, e.g., segments, outside of a visible region can be provided at a lower quality, at a lower resolution and/or updated less frequently. Alternatively or in addition, at least some of the segments outside of an estimated visual region can be excluded from transport altogether. In at least some embodiments, a bandwidth-efficient 360 video VR display system includes a mechanism that allows a client to download a subarea of a video chunk. In some embodiments, a determination of what portion(s) of a frame to fetch can be based on an estimate of a current field of view. Alternatively or in addition, a determination of what portion(s) of a frame to fetch can be based on one or more of content of the video itself, a user profile, user preferences, viewing statistics of others, and so on. Preferably, the prediction is robust and efficient. In at least some instances the system 200 (FIG. 2A) tolerates inaccurate predictions by strategically sacrificing bandwidth in certain situations. In at least some embodiments, the system 200 incurs minimal changes to the client player the server, or both.

For traditional videos, to support simultaneous download and playback, a video is temporally segmented into chunks or byte ranges. To support downloading a segment, sub-region or sub-area of a video chunk, the video also needs to be spatially segmented. This can be realized in an online manner: the client 106 computes the target area of a chunk, and embeds them into HTTP request parameters; the server then dynamically generates a smaller chunk containing only the target area and transmits it to the client. This approach may suffer from two drawbacks. First, it can increase the server-side computational overhead. Second, due to projection, the target area is not a rectangle, making it hard for the client to specify the target area.

In at least some embodiments, the immersive video media item is spatially segmented offline. For example, each 360 video chunk can be pre-segmented into multiple smaller chunks, referred to herein as tiles. A tile can have the same duration as a chunk, while only covering a subarea of the chunk. At least one way to generate the tiles is to evenly divide a chunk containing projected raw frames into m*n rectangles each corresponding to a tile. Suppose the projected visible area is θ. The client only requests for the tiles that overlap with θ. An example chunk 242 is illustrated in the schematic 240 FIG. 2C, where m=8 and n=4, resulting in 32 tiles 248 and where the visible area, θ is illustrated as a bounded region 244. The client may only request the six tiles (4≤x≤6; 1≤y≤2) overlapping with the visible area 244. Note that due to projection, despite the viewer's field-of-view being fixed, the size of the visible area 244 and thus the number of requested tiles 246 may vary. For example, under equi-rectangular projection, as shown in the raw frame 250 (FIG. 2D), more tiles are needed when the viewer looks towards a downward direction 253 compared to when she looks ahead, e.g., in a straight forward direction 251.

Besides the above approach, an alternative and more complex way is to apply segmentation directly on an immersive projection surface, such as a 3D sphere of a 360-degree video, instead of on a projected 2D raw frame or group of frames 242 so that each tile covers a fixed angle, e.g., a fixed solid angle. This makes the number of tiles to be requested irrespective of user's viewing direction (but their total bytes may still vary).

Performing the spatial segmentation of immersive video frames offline can reduce and/or otherwise eliminate server-side overhead. Multiple tiles 246 (FIG. 2C) can be requested in a single bundle to reduce network roundtrips. A tiles' metadata such as positions and/or addresses (e.g., web addresses or URLs) can be embedded in a metafile exchanged at the beginning of a video session.

If a viewer's head movement during a 360 video session is known beforehand, an optimal sequence of tiles can be generated that minimizes the bandwidth consumption. To approximate this in reality, a prediction of head movement is determined, e.g., according to a pitch, yaw, and roll and/or a change of pitch, yaw, and roll.

Estimation errors can be handled using one or more of several strategies. First, due to the online and sliding-window nature of the field-of-view estimation scheme, a previous inaccurate prediction might be fixed by a more recent and accurate prediction. If the new tiles corresponding to the updated prediction can be fetched before the playback deadline, the penalty is only wasted bandwidth. In at least some embodiments, such fixes can be prioritized.

In at least some embodiments, estimations can leverage crowd-sourced statistics. Popular 360 videos from commercial content providers and video sharing websites attract a large number of viewers. A users' viewing behaviors are often affected by the video content, such that at certain scenes, viewers are more likely to look at a certain spots or directions. Consider an example of a mountain climbing video. When "standing" at the peak, viewers may want to enjoy the view by looking all around.

Based on the above intuition, crowd-sourced viewing statistics, which can be collected, e.g., by video servers, can be used to complement head movement prediction. Viewing statistics can be leveraged to estimate the video abandonment rate and to automatically rate video contents. In the context of 360 videos, for each chunk, a server records download frequencies of its tiles, and provides client players with such statistics through metadata exchange. A tile's download frequency can be defined as a number of video sessions that fetch this tile divided by the total number of sessions accessing this video. The client can (optionally) use the statistics to guide the download strategy of out-of-sight (OOS) tiles. For example, a simple strategy is to expand the set of OOS tiles to include tiles whose download frequencies are greater than a configurable threshold. The threshold trades off between bandwidth consumption and user experience.

In at least some embodiments, the estimations and/or selective video fetch of portions of 360 video frames can be integrated with DASH and/or HTTP. Although currently most immersive videos use progressive download, it is envisioned they may switch to DASH. Extensive research has been conducted on improving the QoE of DASH video. A DASH video is split into chunks encoded with multiple discrete bitrate levels; a video player can switch between different bitrate levels at a chunk boundary. In contrast, 360 videos involve more complexity, because the player needs to make decisions at both the temporal and spatial dimension.

An important component of a DASH scheme is its rate adaptation algorithm, which determines the quality level of chunks to fetch. There are largely two categories of approaches: throughput based and buffer-based. A throughput-based rate adaptation algorithm adjusts chunks' quality levels based on estimated throughput. The buffer-based approach, on the other hand, selects the bitrate level based on the player's buffer occupancy level, which implicitly encodes the network capacity information.

For today's immersive video delivery that downloads everything, it requires no change to a DASH algorithm. It is understood that in at least some embodiments, there may be interplay between any of the prediction-based streaming schemes disclosed herein and DASH. At least two categories of DASH algorithms are considered: throughput based and buffer-based. Throughput-based DASH algorithms can work well with the techniques disclosed herein, e.g., when an estimated throughput decreases (increases), the quality level of tiles will decrease (increase) correspondingly. It is understood that the thresholds for quality level switches can be set and/or otherwise adjusted, e.g., statically and/or dynamically. Due to projection and OOS tiles, the required bandwidth in our scheme has higher variance than that for non-360 videos. Thus, the thresholds may need to be adjusted dynamically.

Buffer-based DASH algorithms can also work well with the algorithms can work well with the techniques disclosed herein. One issue here is that in at least some of the disclosed techniques, the player may not want to keep a large buffer occupancy, because predicting viewer's head movement in the long term is difficult. As a result, since the player only maintains a relatively short duration of video contents in the buffer, buffer based DASH algorithms may interact poorly with at least some of the schemes disclosed herein.

Similar to regular DASH, the schemes disclosed herein, in at least some instances, can use HTTP(S) as an underlying delivery protocol. Each tile can be fetched by an HTTP request. A new observation here is that priorities of HTTP transactions play an important role in mitigating the user experience degradation caused by inaccurate prediction. Consider the following example. The player is in the progress of downloading tile "x" whose playback time is t2. Then suddenly, the player realizes a predicted tile to be played at t1<t2 is incorrect. To fix this issue, the player immediately issues a request for tile "y" whose playback time is t1. Since the delivery of tile y is more urgent than tile x, ideally the server should pause the transmission of tile x, and transmit tile y expediently, e.g., at its full speed. This can be realized by giving tile y a higher priority than tile x. New web protocols such as HTTP/2 already support fine-grained control of HTTP transactions' priorities that are very useful in our scheme.

Beneficially, the cellular-friendly 360 video streaming frameworks disclosed herein do not require dependence on any specific projection scheme. Additionally, the disclosed techniques provide robust processes for tolerating prediction errors, for leveraging crowd-sourced playback statistics, and/or for integrating our scheme with DASH and/or HTTP protocols.

Figure 2G:
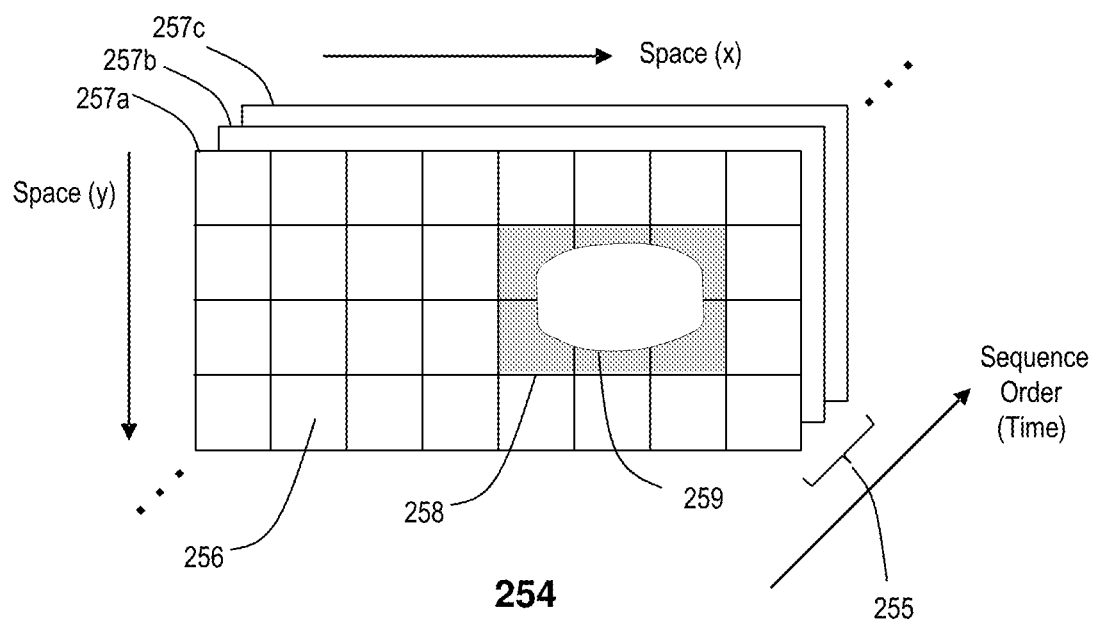
FIG. 2G is a schematic diagram illustrating an example, non-limiting embodiment of a portion of a sequence of immersive video frames that have been spatially segmented by the immersive video processing system of FIG. 2A and viewable by the immersive video viewing system of FIG. 2B in accordance with various aspects described herein.

FIG. 2G is a schematic diagram illustrating an example, non-limiting embodiment of a portion 254 of a sequence of immersive video frames that have been spatially segmented by the immersive video processing system of FIG. 2A and viewable by the immersive video viewing system of FIG. 2B in accordance with various aspects described herein. The example includes a group or "chunk" 255 of three successive immersive video frames 257a, 257b, 257c, generally 257. It is generally understood that one or more of the various techniques disclosed herein can be applied to the different chunks 255. The sequence of frames are processed or otherwise progress in time according to a frame rate, e.g., a number of frames per second. In at least some instances, the frame rate would be faster than typical head movements of an immersive video viewer. This allows the segment selection techniques of one immersive video frame to be applied to a group of successive frames, without necessarily having to repeat the segment selection process.

By way of illustrative example, a frame rate may be 24 frames per second (fps), 25 fps, 30 fps, 60 fps, and so on. Frame rates can be determined according to standards, e.g., movies, television, gaming, and the like. In some embodiments, frame rates can depend on the subject matter of the video. If an anticipated head movement is on the order of $\frac{1}{10}$th of a second, then a video chunk 262 may contain 2, 3, or 6 frames, or perhaps some other number depending on an underlying frame rate. If head movement is expected to occur at a different rate, e.g., slower, say on the order of $\frac{1}{4}$ sec, then the video chunk 255 may contain 6, 8, 15, or perhaps some other number of frames. In either instance, a group of segments selected for transport in one frame, say a first frame 257a of the video chunk 255, can be applied to the remaining number of video frames 257 of the video chunk 255. The process can be repeated for successive chunks, e.g., selecting a new group of segments for transport, and using the same newly selected group of segments for each of the video frames 257 of a subsequent video chunk, and so on.

It is envisioned that in at least some embodiments, a video chunk size can depend upon one of a viewer's gaze or head movement, e.g., a direction of a line of sight and/or orientation of a field of view of the viewer. Thus, if a user's gaze is relatively stationary, then the video chunk size can be extended, e.g., from $\frac{1}{10}$th sec to $\frac{1}{2}$ sec, or greater. In some embodiments, the video chunk size can depend on the immersive video itself and/or objects portrayed in the immersive video. For example, in a relatively stationary scene, such as a landscape, the video chunk size may be increased or extended. Conversely, in a relatively active scene, e.g., in which one or more objects portrayed in the immersive video frame are moving, then the video chunk size may be decreased or reduced. Alternatively or in addition, a group of selected segments can be applied to successive video frames until there is an occurrence of an event, such as a change in a viewer's gaze and/or a change of scene and/or movement of objects portrayed within a scene.

Continuing with the illustrative example, each immersive video frame 257 include a two dimensional array of segments 256. The example schematic includes a 4 by 8 array of segments 256, e.g., 32 segments per frame. It is understood that the immersive video frames 257 can portray objects within a scene.

In at least some embodiments, the object can be identified and or located based on analysis of the immersive video frame 257, e.g., a representative video frame 257 of the chunk 255. For example, the analysis can include image processing and/or feature recognition. In some instances, a target object is determined beforehand. Consider sporting events, in which moving objects, such as players, a ball or puck, are expected to be portrayed within an image. Image processing can identify and/or estimate location(s) of one or more such objects. It is beneficially to identify such objects as a gaze of an immersive video viewer is likely to follow such objects. Even if objects cannot be identified with 100% accuracy or certainty, estimates of locations of such objects can be used to determine which segments are more likely to fall within a viewer's gaze.

It is understood that a viewer's gaze is related to a field of view. The field of view, in at least some instances, is based on an immersive video viewer device. Namely, a display region or surface 213 (FIG. 2) of a video player is generally capable of presenting a sub-region of an immersive video presentation based on a field of view of the device. The particular sub-region of the immersive video presentation is based on an orientation of the viewed region based on the field of view. An example field of view 259 is represented on the video frame 257. In this instance, the field of view 259 overlaps a sub-region 258 defined by a 2 by 3 group of segments 256. It is understood that the actual field of view may include a greater or lesser number of segments that may or may not correspond to a rectangle based on an orientation of the viewer's gaze. For situations in which the size of the field of view is greater than a size of a group of segments 256 portraying the object of interest, the number of segments 256 identified for transport can be increased to at least correspond to the size of the field 258 of view, e.g., 2 by 3 segments in the illustrative example.

Accordingly, the segments 256 to cover the field of view 259 that also include the segments containing an object of interest can be identified for transport for each frame of the video chunk 255. The other segments of the immersive video frame 256, e.g., those segments 256 outside of the group of segments overlapped by the field of view 258 do not necessarily need to be transported for the frames 257 of the video chunk 255. In at least some embodiments, an even greater number of segments, e.g., corresponding to an image region greater than that associated with the field of view can be identified for transport. For example, some number and/or depth of bounding segments can be identified for transport to account for errors, sudden movement of the viewer's gaze, and so on.

In some instances, the location of the field of view 259 is based on the size of the field of view 259 without necessarily having any knowledge of an orientation of an actual field of view. Selecting segments 256 based on the size of the field of view 259 ensures that a sufficient number of segments 256 are identified for transport to cover or otherwise fill a display screen corresponding to the field of view.

In at least some embodiments, identification of an optimal segmentation scheme can be accomplished by first identifying a path of FoVs. Having determined the FoVs, overlapping tiles or segments can be identified and processed as disclosed herein. By way of example, one solution to identifying a path of FoVs is by leveraging a most-frequently-visited path of FoVs for a 360 video. The reason is that the delivered portion is usually determined by the region of interest of viewers, which should be the central part of the FoV.

There are multiple solutions to get this path. For example, a guide feature can be provided for 360 videos, which allows a creator of a 360 video establish a default path for a viewing window, or FoV. By doing this, video creators do not need to worry that viewers will miss the most important FoVs. In at least some instances, the default path also corresponds to a path of most-frequently-visited FoVs, usually including interesting or important content. Another approach of determining a particular or predetermined viewing path is to use a heat map of content viewing frequencies generated from crowdsourced statistics. It is known that users' viewing behaviors are often affected by the video content: at certain scenes, viewers are more likely to look at a certain spots or directions. Consider an example of a mountain climbing video. When viewers are "climbing" towards the peak, they may look upward most of the time to figure out how long it will take to reach the peak. When they make a stop, they may want to look around and enjoy the scene. It is envisioned that in at least some applications, 360 video players can be instrumented to record the frequency of a given FoV, which can be easily collected by video servers. For a given 360 video, a particular tile's download frequency can be defined as a number of video sessions that fetch the particular tile divided by a total number of sessions accessing the given 360 video. By aggregating data collected from many users, e.g., hundreds and/or thousands of users to obtain the crowdsources data, a heat map can be generated showing the most frequently viewed content in a 360 video. In at least some embodiments, an immersive video server 202 (FIG. 2) can record or otherwise track downloads, including previously requested/downloaded tiles for a given frame, temporal segment, 360 video, viewer, etc., without necessarily requiring instrumenting of a 360 video player.

Although the example heat map can be determined based on previously downloaded tiles of a pre-tiled 360 video, it is also possible to obtain related information based on non-tiled or segmented versions and/or views of the 360 video. In such instances, position data can be obtained from an instrumented 360 video player. Position data can include, without limitation, pitch, roll, yaw, in association with a time value and/or a frame value, and/or a segment value, and/or a 360 video value. The time value can be a program time value, e.g., time from a marked program event, such as program start, commercial break, etc.

Having established a viewing path, a data size calculation is applied to determine comparative data sizes, e.g., a numbers of delivered bytes, for different segmentation schemes based on this path. A preferred segmentation scheme can be chosen, such as one that leads to a smallest data size, e.g., a least number of delivered bytes, based on the data size calculation.

Pseudo code of an example process that optimizes segment size is provided below in Table 1. By way of example, and in reference to the sample pseudo code, consider a need to determine an optimal segmentation for a 360 video having "n" video frames. The $FoV_k$ is identified for each frame "k" based on the predetermined viewing path. For illustrative purposes, each video frame is divided into T×2T tiles. An initial tiling resolution is determined with "T" being 2, which leads to an initial 2×4 segmentation.

A set of tiles T that overlap with a $FoV_k$ for a frame k is identified. This can be accomplished, e.g., by determining a position of the $FoV_k$ in relation to the tiled video frame. Once the overlapping tiles have been identified, a data size "S" is determined for the overlapping tiles. In some embodiments, the data size S corresponds to an encoded data size, and is determined after applying a suitable encoding to the overlapping frames. Encoding can include, without restriction, one or more of video encoding, compression, streaming media encoding, forward error correction encoding, and the like. Alternatively or in addition, the data size S can include a delivered size, e.g., including one or more of the aforementioned example encoding schemes as well as additional processing as may be required for transport. Examples include, without restriction, streaming media encoding schemes.

Continuing with the illustrative example, the resulting data size $S_i$ is compared with a value $S_{min}$ whose initial value can be pre-established, e.g., a data size or number of delivered bytes for the initial 2×4 segmentation. The value "i" represents an indexing variable that is updated with subsequent refinements of the tiling resolution. In some instances, an initial value of $S_{min}$ can be determined as some arbitrarily large number, e.g., $10^9$ bytes. If the number of delivered bytes for the 2×4 segmentation, $S_i$ is smaller than $S_{min}$, the value of $S_{min}$ is updated to be S. The indexing variable "i" is increased, e.g., from 1 to 2, a new tiling resolution is determined, e.g., from 2×4 to 4×8, and a determination of the data size $S_2$ is obtained and compared to $S_{min}$. The process continues in this manner, until it is observed that the value $S_i$ is not less than $S_{min}$. This can occur when the coding gain is offset by the out-of-sight tile portions. An optimal segmentation can be determined as a segmentation used in a previous round of the process, e.g., $S_{i-1}$.

TABLE 1

Pseudo Code to Determine Optimal Segmentation
Algorithm 1 Optimal Segment Size

```
Ensure: FoV₁, FoV₂, ... FoVₙ for a 360 video with n
       frames
  1:   Determine the FoVₖ of frame k (k = 1, ...n) using
       either the default-path or the content heat map
  2:   stop = FALSE;
  3:   S_min = S = 0, i = 2, j = 2 × i
  4:   while (stop == FALSE) do
  5:       S = 0
  6:       Segment the video into i × j tiles
  7:       for (k = 1 to n) do
  8:           Get the set of tiles T for the i × j segmentation
                that overlap with FoVₖ
  9:           S = S + sizeof (T)
 10:      end for
 11:      if (i = 2) then
 12:          S_min = S
 13:      else if (S < S_min) then
 14:          S_min = S
 15:      else
 16:          stop = TRUE
 17:      end if
```

TABLE 1-continued

Pseudo Code to Determine Optimal Segmentation
Algorithm 1 Optimal Segment Size

```
18:       if (stop == FALSE) then
19:           i = i + 1, j = 2 × i
20:       end if
21:    end while
22:    i = i − 1, j = 2 × i
23:    Output the optimal segmentation i × j
```

Figure 2H:
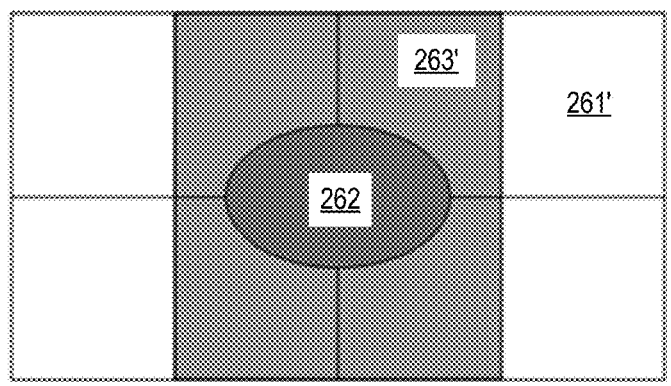
FIG. 2H is a schematic diagram illustrating an example, non-limiting embodiment of a first segmented frame of immersive video functioning within the immersive video processing system of FIG. 2A and viewable by the immersive video viewing system of FIG. 2B in accordance with various aspects described herein.

FIG. 2H is a schematic diagram illustrating an example, non-limiting embodiment of a first segmented frame 260' of immersive video functioning within the immersive video processing system 200 of FIG. 2A and viewable by the immersive video viewing system 230 of FIG. 2B in accordance with various aspects described herein. The first segmented frame 260' includes a 2×4 segmentation, providing eight tiles 261'. A FoV 262 according to a FoV size and/or shape is superimposed onto the first segmented frame 260'. The position of the FoV can be determined according to any of the various techniques disclosed herein, such as the default path and/or the heat map.

The FoV 262, by its placement on the first segmented video frame 260', overlaps a first group of tiles 263', e.g., four tiles. It is understood that only those portions of the tiles of the first group of tiles 263' that actually overlap the FoV 262 will be observable by a video player. Accordingly, a shaded portion of the first group of tiles 263' that is not covered by the overlapping FoV 262 represents waste, as it represents a transport cost for out-of-sight video that will not be observable by the video player. The techniques disclosed herein are direct towards minimizing this waste.

According to the foregoing pseudocode, a data size $S_1$ of the first group of tiles 263' is determined, e.g., after applying encoding and/or video compression. This value S is compared to the initial arbitrarily large value of $S_{min}$. The value of $S_{min}$ can be updated to the value of $S_1$ based on the comparison, or simply set as $S_{min}$, knowing that it is the initial tiling resolution.

Figure 2I:
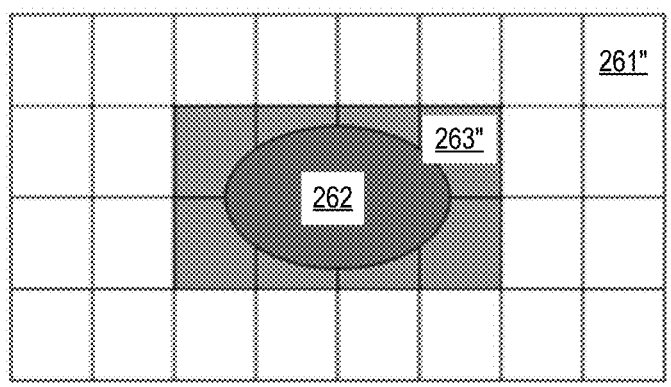
FIG. 2I is a schematic diagram illustrating an example, non-limiting embodiment of a second segmented frame of immersive video functioning within the immersive video processing system of FIG. 2A and viewable by the immersive video viewing system of FIG. 2B in accordance with various aspects described herein.

Continuing with the pseudocode example, FIG. 2I is a schematic diagram illustrating an example, non-limiting embodiment of a second segmented frame 260" of immersive video functioning within the immersive video processing system 200 of FIG. 2A and viewable by the immersive video viewing system 230 of FIG. 2B in accordance with various aspects described herein. In particular, the second segmented frame 260" represents the same underlying video content of the first frame, but segmented according to a different tiling resolution $S_2$. In this instance, the second frame 260" includes a 4×8 segmentation, providing 32 tiles 261". The same FoV 262 according to the same FoV size and/or shape is superimposed onto the second segmented frame 260" at the same location.

The FoV 262, by its placement on the second segmented video frame 260", overlaps a second group of tiles 263", e.g., eight tiles. It is understood that only those portions of the tiles of the second group of tiles 263" that actually overlap the FoV 262 will be observable by a video player. Accordingly, a shaded portion of the second group of tiles 263" that is not covered by the overlapping FoV 262 represents waste, as it represents a transport cost for out-of-sight video that will not be observable by the video player. It can be appreciated that the finer resolution results in a reduction in the shaded area of the second group of tiles 263". The techniques disclosed herein are direct towards further minimizing this waste.

According to the foregoing pseudocode, a data size $S_2$ of the second group of tiles 263" is determined, e.g., after applying encoding and/or video compression. This value $S_2$ is compared to the current value of $S_{min}$. To the extent that $S_2 < S_{min}$, the value of $S_{min}$ can be updated to the value of $S_2$. The process continues in a like manner, until the comparison $S_i < S_{min}$ is no longer true or valid.

Figure 2J:
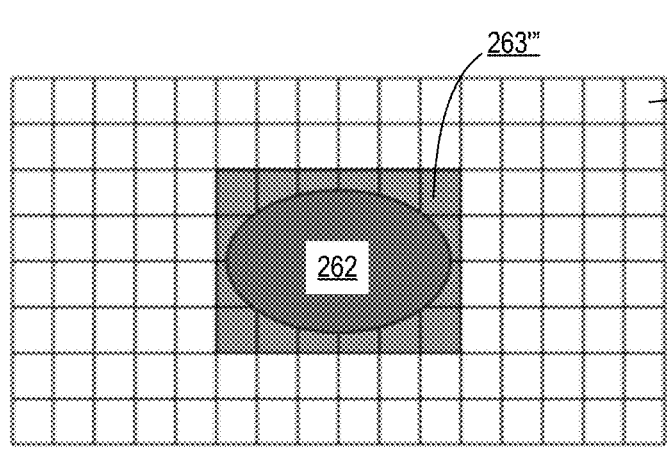
FIG. 2J is a schematic diagram illustrating an example, non-limiting embodiment of a third segmented frame of immersive video functioning within the immersive video processing system of FIG. 2A and viewable by the immersive video viewing system of FIG. 2B in accordance with various aspects described herein.

Continuing with the pseudocode example, FIG. 2J is a schematic diagram illustrating an example, non-limiting embodiment of a third segmented frame 260''' of immersive video functioning within the immersive video processing system 200 of FIG. 2A and viewable by the immersive video viewing system 230 of FIG. 2B in accordance with various aspects described herein. Once again, the third segmented frame 260''' represents the same underlying video content of the first frame, but segmented according to a different tiling resolution $S_3$. In this instance, the second frame 260''' includes a 8×16 segmentation, providing 128 tiles 261'''. The same FoV 262 according to the same FoV size and/or shape is superimposed onto the second segmented frame 260" at the same location.

The FoV 262, by its placement on the third segmented video frame 260''', overlaps a third group of tiles 263''', e.g., 24 tiles. It is understood that only those portions of the third group of tiles 263''' that actually overlap the FoV 262 will be observable by a video player. Accordingly, a shaded portion of the third group of tiles 263''' that is not covered by the overlapping FoV 262 represents waste, as it represents a transport cost for out-of-sight video that will not be observable by the video player. It can be appreciated that the finer resolution once again results in a reduction in the shaded area of the second group of tiles 263". The techniques disclosed herein are direct towards further minimizing this waste.

Up to this point, it can be observed that a covered area of a tile according to the illustrative examples of FIGS. 2H, 2I, 2J correspond to 16:4:1, with the delivered portions of the three example segmentation schemes corresponding to 4, 8 and 24, respectively. As we can see from FIG. 4, the ratio between the areas covered by a tile in these three schemes is 16:4:1. Accordingly, a ratio between the areas covered by the delivered tiles can be determined as:

$$4*16:8*4:24*1 = 64:32:24 = 8:4:3 \qquad \text{Eq. 1}$$

Based on this ratio, switching from $S_1$ to $S_2$ and from $S_2$ to $S_3$ can decrease the areas covered by the delivered tiles by 50% and 25%, respectively. To the extent that the tiles having different sizes $S_1$, $S_2$, $S_3$ have approximately the same video encoding efficiency, the bandwidth saving will decrease according to the finer-grained segmentation scheme (i.e., from 50% to 25%). However, the number of bytes in a tile does not solely depend on its covered area. Larger tiles usually have a higher video encoding efficiency, as they have more opportunities to compress the redundant information within them. Thus, if we continue increase the granularity of segmentation by dividing a 360 videos into a large number of smaller tiles, the number of delivered bytes in the tiles overlapping with the FoV may increase. This observation demonstrates that there exists an optimal segmentation scheme that can maximize the bandwidth saving. Identifying the best segmentation scheme is the problem that the present invention aims to solve.

According to the foregoing pseudocode, a data size $S_3$ of the third group of tiles 263''' is determined, e.g., after applying encoding and/or video compression. This value $S_3$ is compared to the current value of $S_{min}$. To the extent that the relationship $S_3 < S_{min}$ is no longer true, the current value of $S_{min}$ determined during the previous calculation can be identified as an optimal tiling. In this example, the tiling resolution associated with $S_2$ would represent an optimal tiling.

Figure 2K:
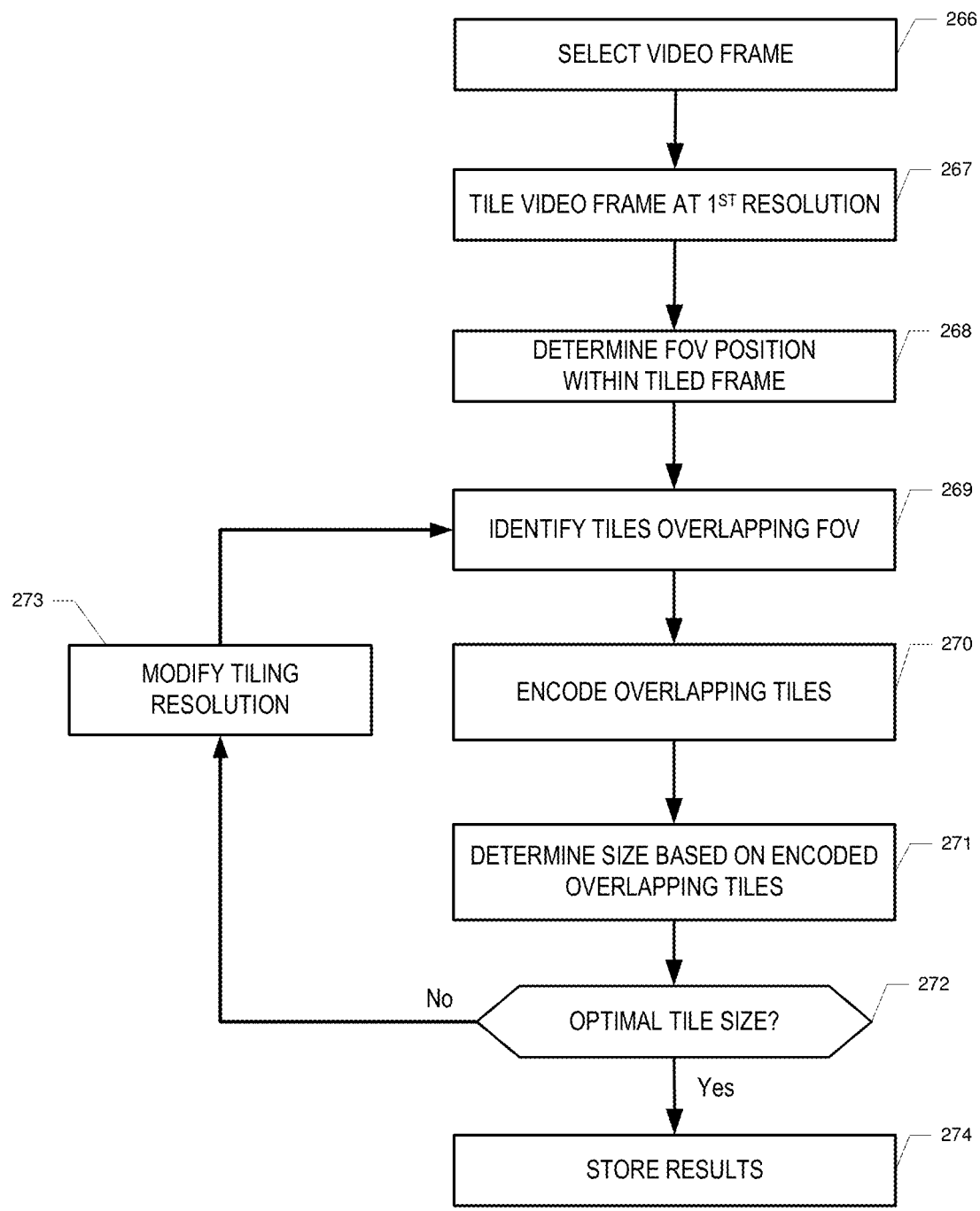
FIG. 2K depicts an illustrative embodiment of a process in accordance with various aspects described herein.

FIG. 2K depicts an illustrative embodiment of a process 265 in accordance with various aspects described herein. The process 265 includes selecting a video frame at 266. An immersive video content item or file includes data organized into a number of sequential frames. The frames can be rectangular, although they don't need to be. In at least some embodiments, the frames include mapped data obtained from a 360 or panoramic video capture system and mapped onto a surface represented by the video frame. In an exemplary embodiment, the frame is rectangular.

The video frame is tiled at 267 according to a first resolution or granularity. As disclosed herein a tiling process includes subdividing the video frame into multiple smaller segments or tiles, referred to as a tiled or segmented video frame. In at least some embodiments, the tiles are non-overlapping and collectively span the entire area or space of the video frame. In at least some embodiments, the tiles are uniform, e.g., having a common size and/or shape. According to the illustrative examples provided herein, the video frame is rectangular, as are the tiles. Other shapes and/or sizes, e.g., triangles, polygons, are contemplated, with similar results. The resolution can refer to one or more of a total number of the tiles that span the entire video frame, a size, e.g., area, of the individual tiles and/or a configuration of the tiles, e.g., according to an M×N array, in which M rows of N tiles.

A FoV position is determined at 268. The FoV position can be determined within the video frame directly or according to a mapping algorithm. For example, a view of a user of a 360 viewer can include coordinates and/or values that identify where the user is looking when the video frame is presented. The coordinates and/or values can include, without restriction, pitch, yaw and roll. Having mapped the 360 video to the planar frame, the pitch, yaw and roll coordinates can be mapped to a location within the planar frame. A FoV area corresponding to a portion of the tiled video frame that would be visible using a 360 video player at the FoV position can be mapped or otherwise superimposed on the tiled video frame. In doing so, it will be evident that the FoV area overlaps one or more of the tiles.

Those tiles overlapping the suitably positioned FoV area can be identified at 269. In at least some embodiments, care is taken to ensure that all of the FoV area is covered by the overlapping tiles. Had any portion not been overlapped by the identified overlapping tiles, a corresponding region would be missing in the FoV of the 360 video player. It is also understood that identifying overlapping tiles in this manner will result in some portion of the identified overlapping tiles, e.g., represented by tile fractions, that is not covered by the suitably positioned FoV, sometimes referred to as out of sight region(s).

Continuing with the process, coding is applied to the identified overlapping tiles at 270. Coding can include any of the example coding schemes disclosed herein, such as video encoding, video compression, and the like. A size of the encoded, overlapping tiles is determined at 271. In at least some applications, a size of the encoded overlapping tiles is measured in bytes. This size can give some indication as to a corresponding storage cost associated with storing a tiled, encoded version of the video. Likewise, the size can give some indication as to a corresponding transport cost, e.g., data usage and/or bandwidth associated with transporting the tiled, encoded version of the video.

A determination is made at 272 as to whether the current tiling resolution represents an optimal tiling resolution. To the extent that it doesn't, the tiling resolution is modified at 273, and the process repeats from 269, using the same FoV position applied to the same video frame tiled according to the modified tiling resolution. Accordingly, tiles of the modified tiling that overlap the suitably positioned FoV are identified at 269 and encoded at 270. Again, a size based on the encoded, overlapping modified tiles is determined at 271, and a determination is made at 272 as to whether the modified tiling resolution corresponds to an optimal tile size at 272. To the extent it doesn't, the process continues to repeat with further modified resolutions at 273, until at some point a determination is made at 272 that an optimal tile size has been identified.

In at least some embodiments, the initial resolution is relatively coarse, e.g., using a single tile (no tiling), or a minimal tiling, e.g., two tiles or four tiles, or some other coarse tiling. In starting with coarse tile resolution, the modifications to the tile resolution at 273 will include tile refinements. Namely, the number and/or arrangement of tiles will include tiles having individual areas that are smaller than the previous resolution. As the tile sizes shrink in this manner, the wasted out of sight portion of the overlapping tiles is lessened. However, the smaller tiles, at some point, will lead to a reduction in encoding, e.g., compression, efficiency. Accordingly, it is expected that the size determined at 271 will initially decrease until, at some point the, decrease do to reduction in wasted out of sight regions is offset by reductions in encoding efficiency. In at least some instances, this is detected as a relative increase in the size determined at 271 despite the use of a finer tiling resolution at 273. Once the increase is detected, an optimal tiling resolution or size can be identified as the tiling resolution or size associated with the previous tiling resolution.

Figure 2L:
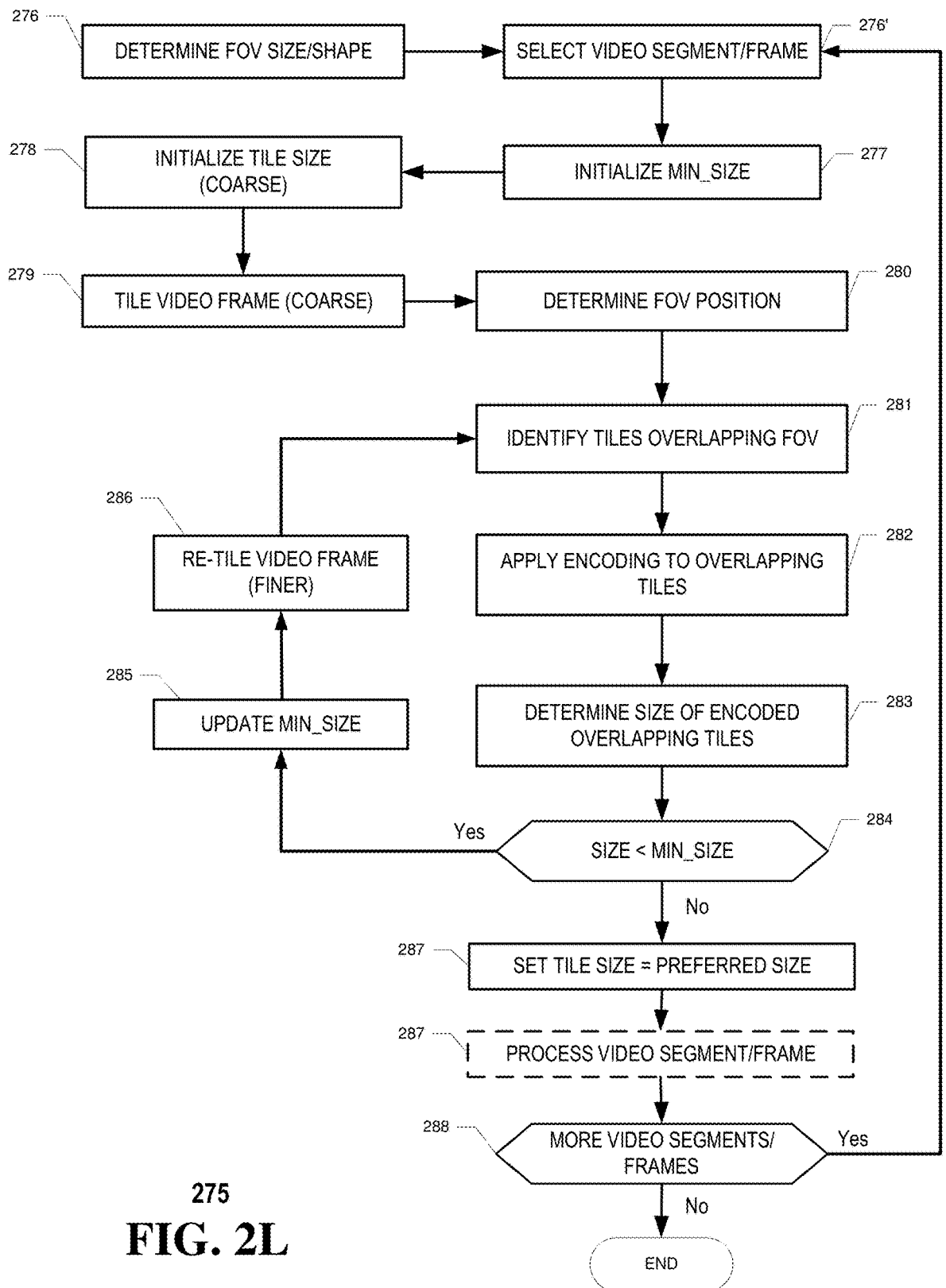
FIG. 2L depicts an illustrative embodiment of another process in accordance with various aspects described herein.

FIG. 2L depicts an illustrative embodiment of a process 280 in accordance with various aspects described herein. A size and or shape of a FoV is identified at 276. It is envisioned that in at least some applications, a size of the FoV is based at least in part on an equipment parameter associated with the immersive video player. Alternatively or in addition, the FoV can be based, at least in part, on a playback parameter, such as a location of the viewer, a magnification or zoom applied to the playback, and so on.

Continuing with the process 275, a video segment is selected at 276'. The video segment can be a single video frame, and/or a temporal segment including a group of consecutive frames. In at least some embodiments, the processes disclosed herein are performed on one frame of a temporal segment of frames, e.g., 1 second worth of playback, with the resulting resolution applied to all frames of the same temporal segment. For an MPEG-4 video at 30 frames per second, the processing can be applied to every $30^{th}$ frame of the sequence of frames of the video content item, representing once per second. In some embodiments, the temporal segment size is constant. Alternatively or in addition, the temporal size can vary. Variations can depend on one or more of user movement of a particular user, movement based on heat map results and/or a default path, and/or based on subject matter of the video content. Active or busy scenes may benefit from shorter segment processing size, e.g., 0.5 sec, or 0.1 sec, whereas relatively quiet or uniform scenes can be processed at longer temporal segment sizes, e.g., 1 sec, 2 sec, or more.

An initial minimum or reference data size is established at 277. Since this is a value that is being minimized, in at least some of the embodiments, it can be set at an arbitrarily large value, e.g., $10^{12}$ bytes. In some embodiments, the initial minimum or reference size corresponds to an encoded size of a non-segmented version of the frame being processed, or an initial coarse segmented version of the frame.

An initial tiling resolution or size is determined at 278. Again, according to the example embodiments, the initial tiling resolution is coarse, such that the individual tile areas are relatively large, i.e., one to a few tiles per frame. The selected video frame is tiled or otherwise spatially segmented at 279 according to the initial, coarse tiling. A FoV position is determined at 280, with respect to the tiled video frame and overlapping tiles are identified at 281. The overlapping tiles are encoded at 282, e.g., video encoded, and a size of the encoded, overlapping tiles is determined at 283.

A determination is made at 284 as to whether the size of the encoded, overlapping tiles is less than the initial minimum size. To the extent the initial minimum size is established at a relatively large number, it is expected that the size of the encoded, overlapping tiles will be less. To the extent this is true, the minimum or reference size is updated at 285 based on the size of the encoded, overlapping tiles. A finer tiling is determined at 286, and the process 275 continues from 281. Namely, tiles overlapping the same suitably positioned field of view are identified at 281, encoded at 282 and sized at 283. Again, the resulting size of the encoded, overlapping finer tiles is compared to the updated minimum or reference size at 284. The process 275 continues in this manner, until at some refinement of the tiling resolution, the video encoding or compression gain or efficiency is reduced, leading to the size being greater than the current version of the minimum or reference size.

Having established a critical tiling resolution or size as the last tiling resolution or size before an increase is detected at 284, a preferred tiling size or resolution can be established at 287. In some embodiments, the video is optionally processed according to the preferred tiling size or resolution at 287 (shown in phantom). The processed video, e.g., including the overlapping tiles at the preferred tiling size or resolution can be processed and stored in a video repository for serving later requests. Alternatively or in addition, the processed video can be served without first being stored.

In the illustrative example, the process 275 includes a determination at 288 as to whether more video segments and/or frames remain to be processed. To the extent there are additional segments/frames, the process 275 repeats from 276'. Namely another video segment and/or frame is selected at 276', a minimum size is re-initialized at 277, an initial, relatively coarse tiling is established at 278 and the selected segment/frame is tiled according to the initial, relative coarse tiling at 279. Another FoV position is established at 280 based on the newly selected segment/frame, overlapping tiles are identified at 281, and so on until another preferred tile size is determined at 287.

In some embodiments, the preferred size is determined for each frame, based an evaluation of a single frame according to comparisons of the sizes of the encoded, overlapping tiles of the frame. Alternatively or in addition, the same preferred size is determined for a sequential group of frames, based an evaluation of the sequential group of frames according to comparisons of the sizes of the encoded, overlapping tiles of the sequential group of frames. Sequential groups of frames can include the temporal processing segments disclosed herein, e.g., 1-second chunks of the video. Alternatively or in addition the sequential groups of frames are determined according to content of the video, e.g., scenes, action, colors, complexity as determined by one or more of evaluation of the content of the video frame, content of metadata associated with the video content item and/or content from a separate source, such as a descriptive file.

In at least some embodiments, the same preferred size is determined for the entire video content item, based an evaluation of the all of the frames according to comparisons of the sizes of the encoded, overlapping tiles of the frames of the entire video content item. In some embodiments, the preferred size is determined for the entire video content item, based on an evaluation of all of the temporal segments or chunks, e.g., according to processing of a representative frame from each chunk.

While for purposes of simplicity of explanation, the respective processes are shown and described as a series of blocks in FIG. 2K, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and the processes 265, 275 presented in FIGS. 1, 2A, 2B, 2C, 2E, 2F, 2G, 2H, 2I, 2J and 2K.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a virtual network element 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 330, 332 or 334. These network elements can be included in transport layer 350.

The virtualized network function cloud 325 interfaces with the transport layer 350 to provide the virtual network elements 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, virtualized network elements 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNE 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations. It is understood that one or more of the subsystems and functions of communication network 100, the subsystems and functions of system 200, and the processes 265, 275 presented in FIGS. 1, 2A, 2B, 2C, 2E, 2F, 2G, 2H, 2I, 2J and 2K can be implemented in one or more of the VNEs, 330, 332, 334 of the virtualized network function cloud. For example, one or more of the VNEs 330, 332, 334 can implement one or more of the immersive video server 202, the video tiling optimizer 222, the segment selection module 226, the request servicer 221, of FIG. 2, and the like.

Figure 4:
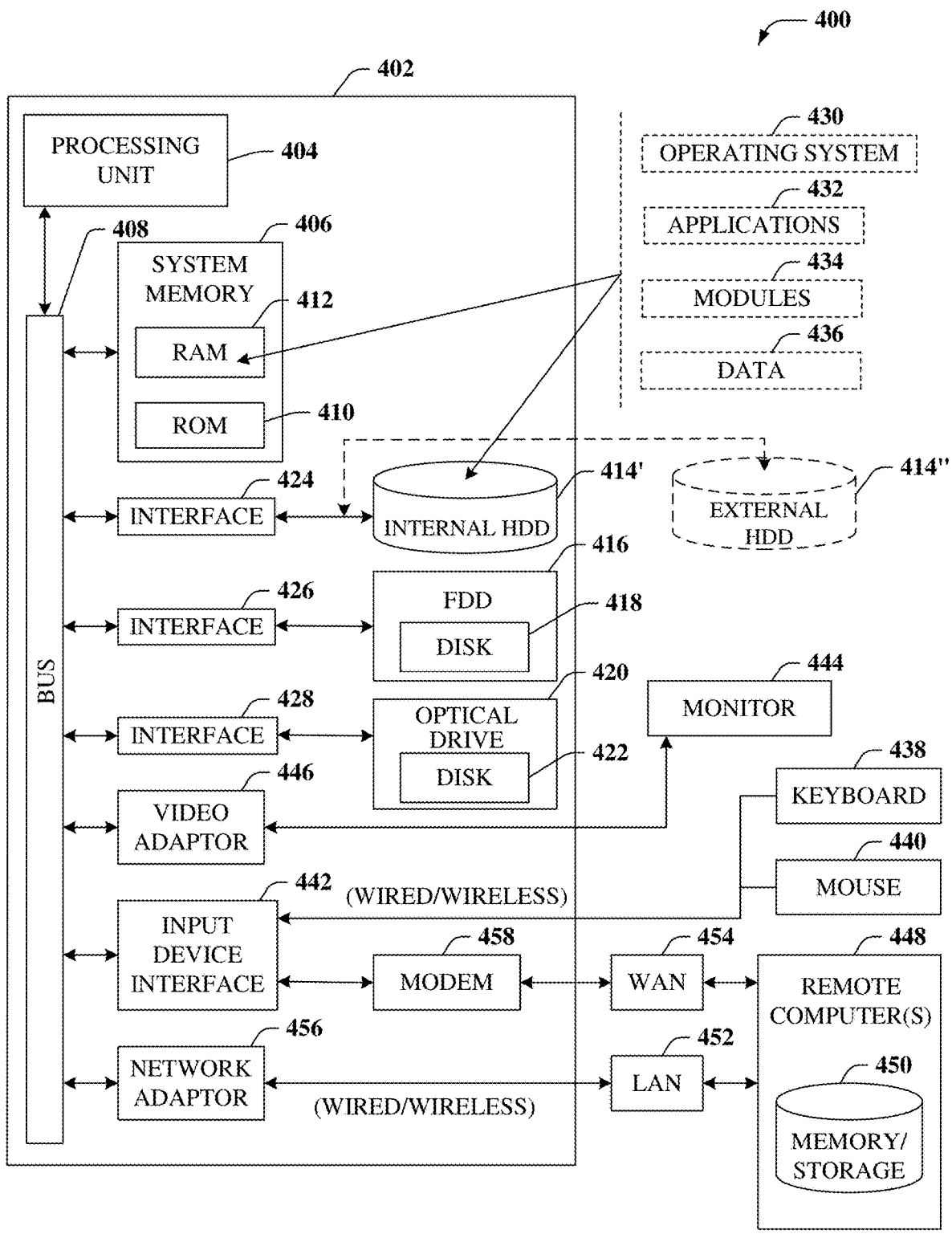
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, the immersive video server 202, the video tiling optimizer 222, the segment selection module 226, the request servicer 221, the media content source 204, the immersive video client 206, the requestor 220, the orientation estimator 218, the orientation detector 216, the user profile server 227 of FIG. 2A, and the like. and/or virtual network elements 330, 332, 334, etc. Each of these devices can be implemented via computer-executable instructions that can run on one or more computers, and/or in combination with other program modules and/or as a combination of hardware and software. Alternatively or in addition, the computing environment ca be configured to perform one or more of the processes disclosed herein, such as the processes 265, 275 of FIGS. 2K and 2L Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414' (e.g., EIDE, SATA), which internal hard disk drive 414' can also be configured for external use as an external hard disk drive 414" in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414', 414", generally 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN)

452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
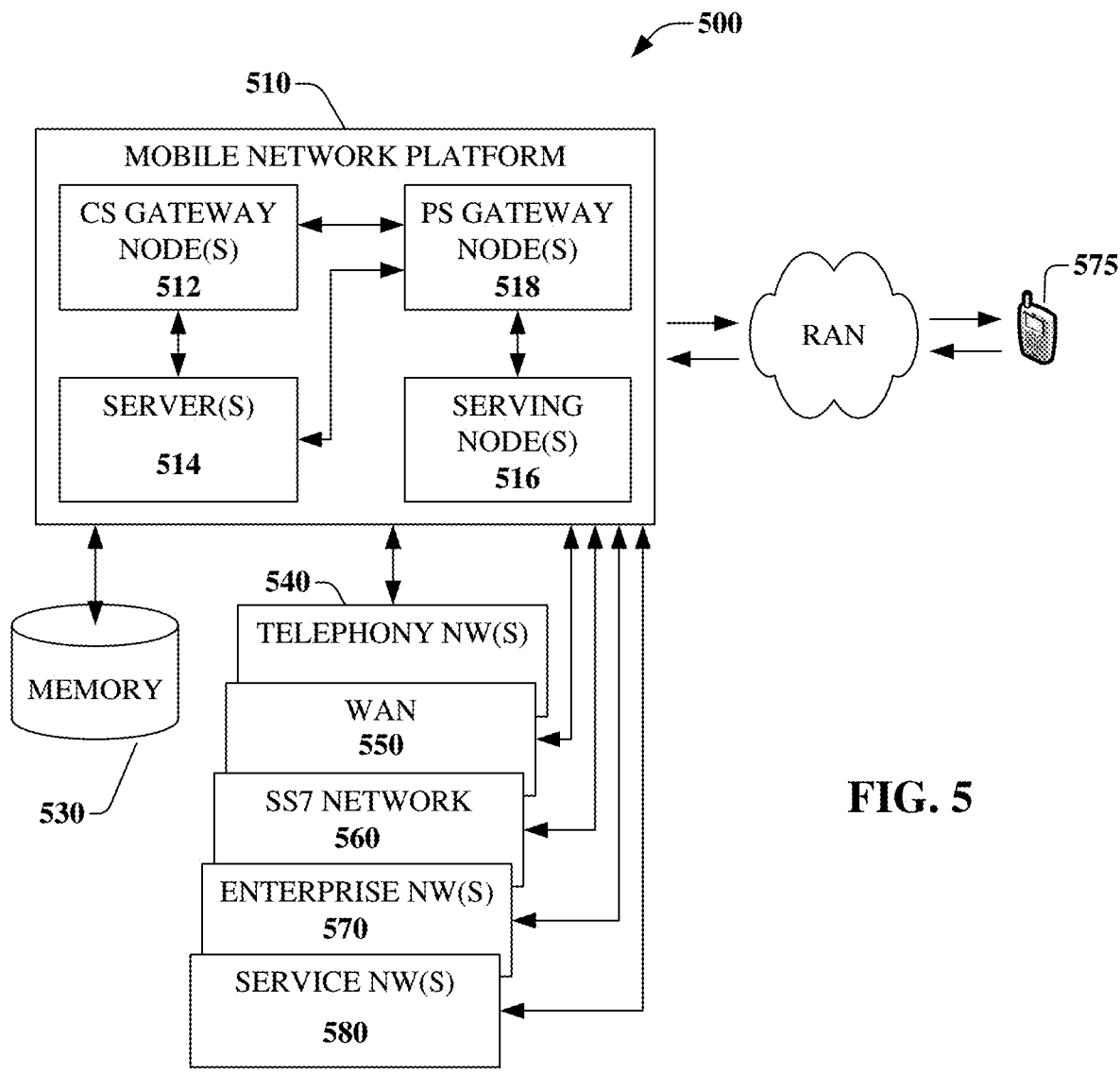
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, the display devices 144, of FIG. 1, the immersive video viewing system 230 of FIG. 2B, the immersive video server 202, the video tiling optimizer 222, the segment selection module 226, the request servicer 221, the media content source 204, the immersive video client 206, the requestor 220, the orientation estimator 218, the orientation detector 216, the user profile server 227 of FIG. 2A, and the like and/or virtual network elements 330, 332, 334, etc. In one or more embodiments, the mobile network platform 510 can generate and receive signals transmitted and received by base stations or access points such as base station or access point 122. Generally, wireless network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 570. Circuit switched gateway node(s) 512 can authorize and authenticate traffic (e.g., voice) arising from such networks. Additionally, CS gateway node(s) 512 can access mobility, or roaming, data generated through SS7 network 570; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the wireless network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 560 can embody, at least in part, a service network(s) like IP multimedia subsystem (IMS). Based on radio technology layer(s) available in technology resource(s) 517, packet-switched gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, wireless network platform 510 also comprises serving node(s) 516 that, based upon available radio technology layer(s) within technology resource(s) 517, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in wireless network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to wireless network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of macro wireless network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of wireless network platform 510. Other operational information can comprise provisioning information of mobile devices served through wireless platform network 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, enterprise network(s) 570, or SS7 network 560. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
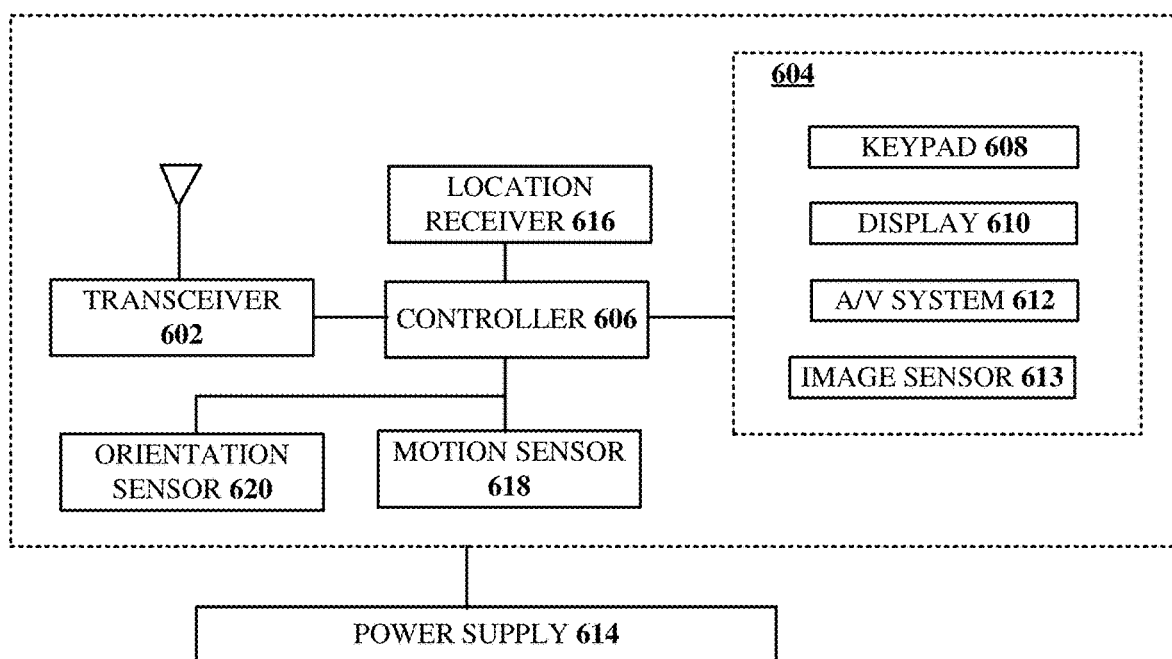
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125, the immersive video viewing system 230 of FIG. 2B, the immersive video server 202, the video tiling optimizer 222, the segment selection module 226, the request servicer 221, the media content source 204, the immersive video client 206, the requestor 220, the orientation estimator 218, the orientation detector 216, the user profile server 227 of FIG. 2A, and the like.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
obtaining an adjustable playback parameter of a communication device that renders immersive video content;
obtaining crowdsource statistics regarding viewing of the immersive video content by a group of users;
generating a heat map based on the crowdsource statistics, wherein the heat map indicates a frequency range of fields of view of the immersive video content by the group of users;
obtaining historical observations of past views of the immersive video content;
determining a field of view based on the adjustable playback parameter, heat map, and the historical observations;
determining an initial encoded data size value based on a size of an encoded version of a first group of tiles overlapping the field of view, the first group of tiles determined according to an initial tile size, a portion of an immersive video content item segmented according to an initial tile size;
initializing a reference encoded data size variable to the initial encoded data size value;
determining a tiling scenario, wherein the determining of the tiling scenario comprises:
determining an updated encoded data size based on a size of an encoded version of an updated group of tiles overlapping the field of view, the updated group of tiles determined according to a reduced tile size; and
comparing the updated encoded data size to the reference encoded data size variable to obtain a comparison result;
responsive to the comparison result indicating that the updated encoded data size is less than the reference encoded data size variable, repeating the determining of the tiling scenario according to a further-reduced tile size; and
responsive to the comparison result indicating that the updated encoded data size is not less than the reference encoded data size variable, identifying the tiling scenario according to the reduced tile size, further reduction of the reduced tile size increasing the updated encoded data size, wherein a portion of an immersive video content item is segmented according to the tiling scenario.

2. The device of claim 1, wherein the field of view occupies a corresponding area within a first video frame of the immersive video content item.

3. The device of claim 1, wherein the tiling scenario comprises a coarse tiling scenario by which a video frame of the immersive video content item segmented according to the tiling scenario has a first number of associated tiles.

4. The device of claim 3, wherein the updated group of tiles comprises a second number of associated tiles greater the first number of associated tiles according to the tiling scenario.

5. The device of claim 4, wherein a difference between the first number of associated tiles and the second number of associated tiles is not less than a factor of two.

6. The device of claim 1, wherein the portion of the immersive video content item comprises a plurality of consecutive video frames, and wherein the plurality of consecutive video frames is segmented according to the tiling scenario.

7. The device of claim 1, wherein the portion of the immersive video content item comprises all video frames of the immersive video content item.

8. The device of claim 1, wherein the determining of the tiling scenario comprises encoding the updated group of tiles resulting in the encoded version of the updated group of tiles.

9. The device of claim 8, wherein the encoding of the updated group of tiles comprises video encoding the updated group of tiles.

10. The device of claim 9, wherein the video encoding comprises one of HEVC encoding, VP9 encoding, AV1 encoding or any combination thereof.

11. A non-transitory, machine-readable storage medium, comprising executable instructions that, when executed by a processing system including a processor, facilitate performance of operations, the operations comprising:
   obtaining crowdsource statistics regarding viewing of an immersive video content by a group of users;
   generating a heat map based on the crowdsource statistics, wherein the heat map indicates a frequency range of fields of view of the immersive video content by the group of users;
   evaluating the heat map based on prior views of the immersive video content item;
   obtaining an adjustable playback parameter of a communication device that renders immersive video content;
   obtaining historical observations of past views of the immersive video content;
   identifying a field of view based on the heat map, the adjustable playback parameter, and the historical observations;
   determining an initial encoded data size value based on a size of an encoded version of a first group of tiles overlapping the field of view, the first group of tiles determined according to an initial tile size, a portion of the immersive video content item segmented according to an initial tile size;
   initializing a reference encoded data size variable to the initial encoded data size value;
   determining a tiling scenario, wherein the determining of the tiling scenario comprises:
      determining an updated encoded data size based on a size of an encoded version of an updated group of tiles overlapping the field of view, the updated group of tiles determined according to a reduced tile size; and
      comparing the updated encoded data size to the reference encoded data size variable to obtain a comparison result;
   responsive to the comparison result indicating that the updated encoded data size is less than the reference encoded data size variable, repeating the determining of the tiling scenario according to a further-reduced tile size; and
   responsive to the comparison result indicating that the updated encoded data size is not less than the reference encoded data size variable, identifying the tiling scenario according to the reduced tile size, further reduction of the reduced tile size increasing the updated encoded data size, wherein the portion of the immersive video content item is segmented according to the tiling scenario.

12. The non-transitory, machine-readable storage medium of claim 11, wherein the tiling scenario comprises a coarse tiling scenario by which a video frame of the immersive video content item segmented according to the tiling scenario has a first number of associated tiles.

13. The non-transitory, machine-readable storage medium of claim 12, wherein the updated group of tiles comprises a second number of associated tiles greater the first number of associated tiles according to the tiling scenario.

14. The non-transitory, machine-readable storage medium of claim 11, wherein the portion of the immersive video content item comprises a plurality of consecutive video frames, and wherein the plurality of consecutive video frames is segmented according to the tiling scenario.

15. The non-transitory, machine-readable storage medium of claim 11, wherein the determining of the tiling scenario comprises encoding the updated group of tiles resulting in the encoded version of the updated group of tiles.

16. The non-transitory, machine-readable storage medium of claim 15, wherein the encoding comprises one of HEVC encoding, VP9 encoding, AV1 encoding or any combination thereof.

17. A method, comprising:
   obtaining, by a processing system including a processor, crowdsource statistics regarding viewing of an immersive video content by a group of users;
   generating, by the processing system, a heat map based on the crowdsource statistics, wherein the heat map indicates a frequency range of fields of view of the immersive video content by the group of users;
   obtaining historical observations of past views of the immersive video content;
   identifying, by the processing system, a default path of the immersive video content item based on the heat map and the historical observations of past views of the immersive video content item;
   obtaining, by the processing system, an adjustable playback parameter of a communication device that renders immersive video content;
   determining, by the processing system, a field of view based on the default path and the adjustable playback parameter;
   determining, by the processing system, an initial encoded data size value based on a size of an encoded version of a first group of tiles overlapping the field of view, the first group of tiles determined according to an initial tile size, a portion of the immersive video content item segmented according to an initial tile size;
   initializing, by the processing system, a reference encoded data size variable to the initial encoded data size value;
   determining, by the processing system, a tiling scenario, wherein the determining of the tiling scenario comprises:
      determining, by the processing system, an updated encoded data size based on a size of an encoded version of an updated group of tiles overlapping the field of view, the updated group of tiles determined according to a reduced tile size; and
      comparing, by the processing system, the updated encoded data size to the reference encoded data size variable to obtain a comparison result;
   responsive to the comparison result indicating that the updated encoded data size is less than the reference encoded data size variable, repeating, by the processing system, the determining of the tiling scenario according to a further-reduced tile size; and responsive to the comparison result indicating that the updated encoded data size is not less than the reference encoded data size variable, identifying, by the processing system, the tiling scenario according to the reduced tile size, further reduction of the reduced tile size increasing the updated encoded data size, wherein a portion of the immersive video content item is segmented according to the tiling scenario.

18. The method of claim 17, wherein the tiling scenario comprises a coarse tiling scenario by which a video frame of the immersive video content item segmented according to the tiling scenario has a first number of associated tiles.

19. The method of claim 17, wherein the portion of the immersive video content item comprises a plurality of consecutive video frames, and wherein the plurality of consecutive video frames is segmented according to the tiling scenario.

20. The method of claim 17, wherein the determining of the tiling scenario comprises encoding, by the processing system, the updated group of tiles resulting in the encoded version of the updated group of tiles.

* * * * *

UNITED STATES PATENT AND TRADEMARK OFFICE
CERTIFICATE OF CORRECTION

PATENT NO. : 11,395,003 B2  
APPLICATION NO. : 17/020229  
DATED : July 19, 2022  
INVENTOR(S) : Bo Han et al.

Page 1 of 1

It is certified that error appears in the above-identified patent and that said Letters Patent is hereby corrected as shown below:

In the Claims

Claim 11: Column 43, Line 31, delete "the", insert --an--

Claim 17: Column 44, Line 36, delete "the", insert --an--

Signed and Sealed this  
Eleventh Day of March, 2025

Coke Morgan Stewart  
*Acting Director of the United States Patent and Trademark Office*